US011656994B2

(12) United States Patent
Hahn et al.

(10) Patent No.: US 11,656,994 B2
(45) Date of Patent: May 23, 2023

(54) NON-VOLATILE MEMORY WITH OPTIMIZED READ

(71) Applicant: WESTERN DIGITAL TECHNOLOGIES, INC., San Jose, CA (US)

(72) Inventors: Judah Gamliel Hahn, Ofra (IL); Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 88 days.

(21) Appl. No.: 17/306,073

(22) Filed: May 3, 2021

(65) Prior Publication Data
US 2022/0350747 A1    Nov. 3, 2022

(51) Int. Cl.
G06F 12/08 (2016.01)
G06F 13/16 (2006.01)
G06F 13/42 (2006.01)
G06F 12/0868 (2016.01)
G06F 12/0871 (2016.01)

(52) U.S. Cl.
CPC ...... G06F 12/0868 (2013.01); G06F 12/0871 (2013.01); G06F 13/1668 (2013.01); G06F 13/4221 (2013.01)

(58) Field of Classification Search
CPC ............ G06F 13/1668; G06F 13/4221; G06F 12/0878; G06F 12/0871
USPC ....................................................... 711/154
See application file for complete search history.

(56) References Cited

U.S. PATENT DOCUMENTS

| 9,612,776 | B2 * | 4/2017 | Andrews | G06F 12/084 |
| 9,940,229 | B2 | 4/2018 | Shen | |
| 10,366,016 | B2 | 7/2019 | Makunan | |
| 10,599,579 | B2 * | 3/2020 | Kumar | G06F 12/0895 |
| 10,909,012 | B2 | 2/2021 | Yang | |
| 2009/0198945 | A1 * | 8/2009 | Sekhar | G06F 12/0804 711/E12.001 |

(Continued)

OTHER PUBLICATIONS

Chadha, "NVMe SSDs with Persistent Memory Regions," Toshiba Memory America, Inc., Santa Clara, CA, Aug. 2018.

(Continued)

*Primary Examiner* — Christopher B Shin
(74) *Attorney, Agent, or Firm* — Vierra Magen Marcus LLP

(57) ABSTRACT

A non-volatile storage system that is implementing a storage region (e.g., a persistent memory region) which is accessible to a host (e.g., via a PCIe connection) and a cache for the storage region shares details of the structure of the storage region and/or the cache (e.g., cache segment size). With awareness of the shared details of the structure of the storage region and/or the cache, the host arranges and sends out requests to read data from the persistent memory region in a manner that takes advantage of parallelism within the non-volatile storage system. For example, the host may initially send out one read request per cache segment to cause the non-volatile storage system to load the cache. Subsequently, additional read requests are made to the non-volatile storage system, with the data already loaded (or starting to load) in the cache, thereby increasing performance.

18 Claims, 16 Drawing Sheets

(56) References Cited

U.S. PATENT DOCUMENTS

| | | | | |
|---|---|---|---|---|
| 2015/0347247 A1* | 12/2015 | Baek | .................. | G06F 12/0868 |
| | | | | 714/6.11 |
| 2016/0034394 A1* | 2/2016 | McKean | ............. | G06F 12/0891 |
| | | | | 709/217 |
| 2018/0181530 A1* | 6/2018 | Kantecki | ............. | G06F 13/4282 |
| 2019/0266097 A1* | 8/2019 | Jain | ....................... | G06F 3/0611 |
| 2020/0034061 A1* | 1/2020 | Khalili | .................. | G06F 3/0659 |
| 2020/0151104 A1* | 5/2020 | Yang | .................. | G06F 12/0804 |
| 2021/0216452 A1* | 7/2021 | Muralidhara | ....... | G06F 12/0895 |
| 2021/0248078 A1* | 8/2021 | Grosz | .................. | G06F 3/0679 |

OTHER PUBLICATIONS

"Down to the TLP: How PCI express devices talk (Part I)," xillybus.com, Nov. 13, 2012, Available at: http://xillybus.com/tutorials/pci-express-tlp-pcie-primer-tutorial-guide-1.

"What is Persistent Memory Region?," NVM Express, Apr. 15, 2020, Available at: https://nvmexpress.org/faq-items/what-is-persistent-memory-region/.

NVM Express—Base Specification, Revision 1.4b, NVM Express Workgroup, Beaverton, Oregon, Sep. 21, 2020.

* cited by examiner

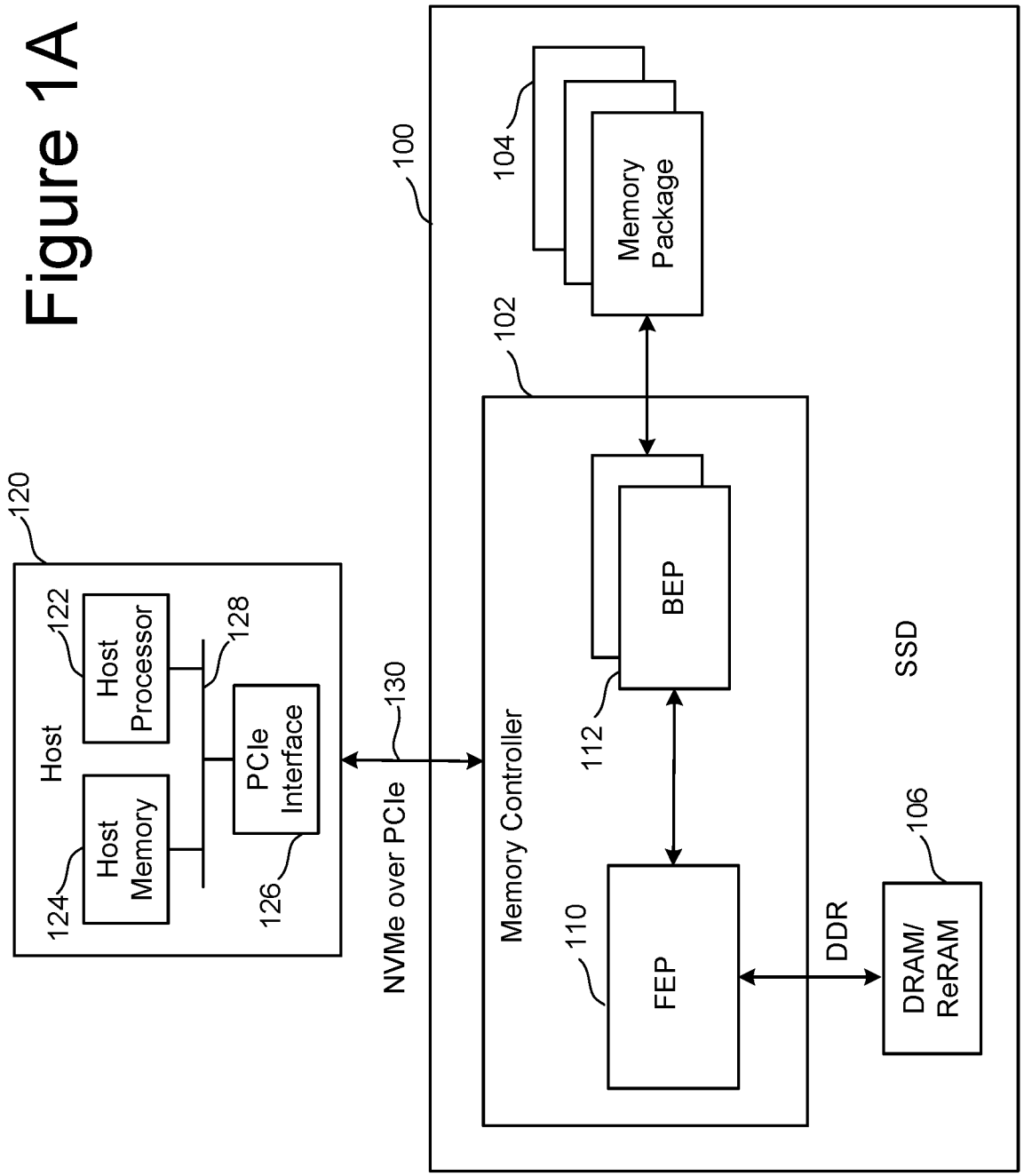

Figure 4A

| 31 | | | | | | | 15 | | | | 0 |
|---|---|---|---|---|---|---|---|---|---|---|---|
| R | FMT | Type | R | TC | R | TD | EP | Attr | R | Length | |
| Requester ID | | | | | Tag | | | | R | 1st BE | |
| Address | | | | | | | | | | | R |

Figure 4B

| 31 | | | | | | | 15 | | | | 0 |
|---|---|---|---|---|---|---|---|---|---|---|---|
| R | FMT | Type | R | TC | R | TD | EP | Attr | R | Length | |
| Completer ID | | | | | Status | | BCM | Byte Count | | | |
| Requester ID | | | | | Tag | | | | R | LowerAddress | |
| Data | | | | | | | | | | | |

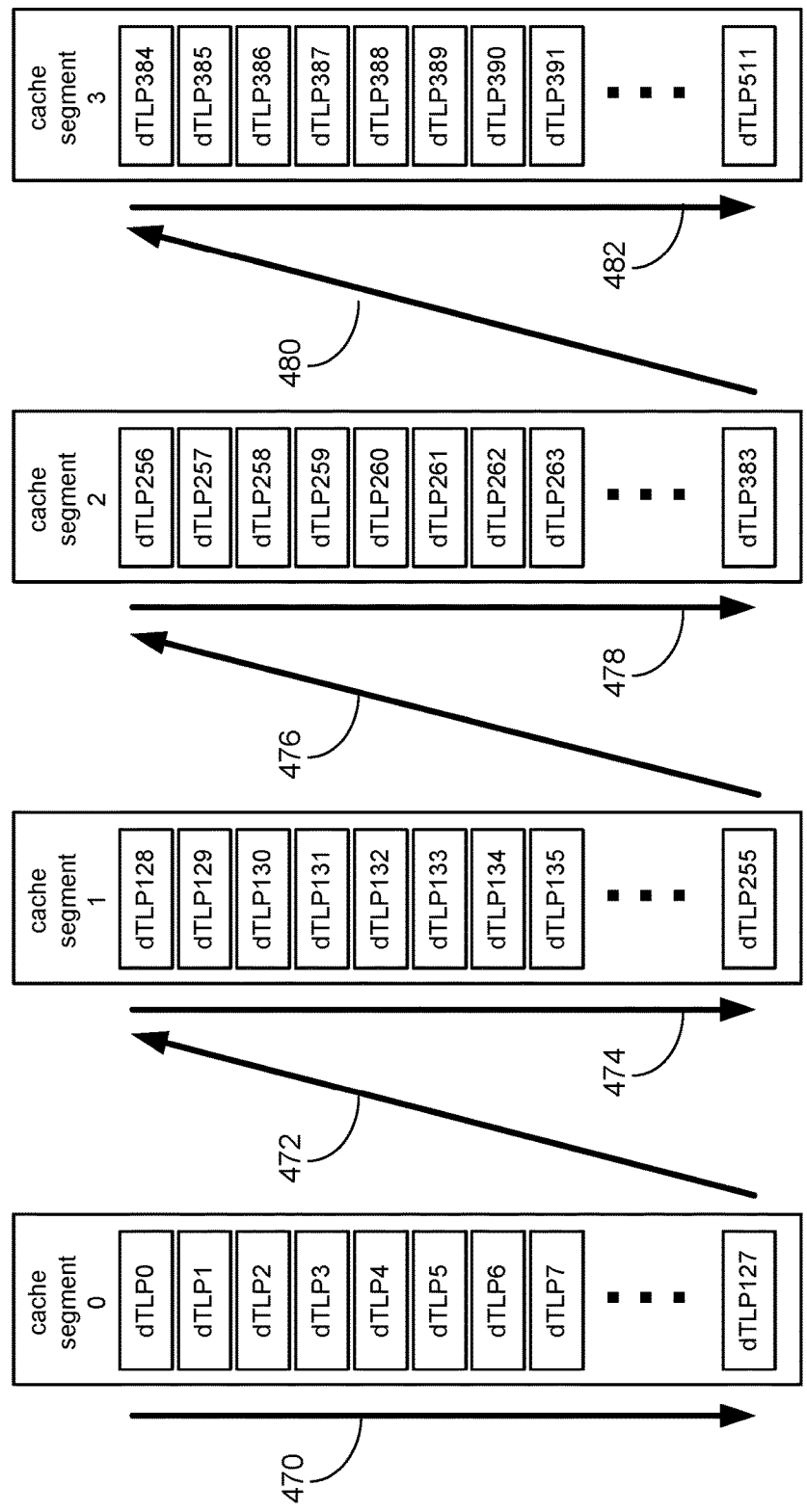
Figure 5A
Figure 5B

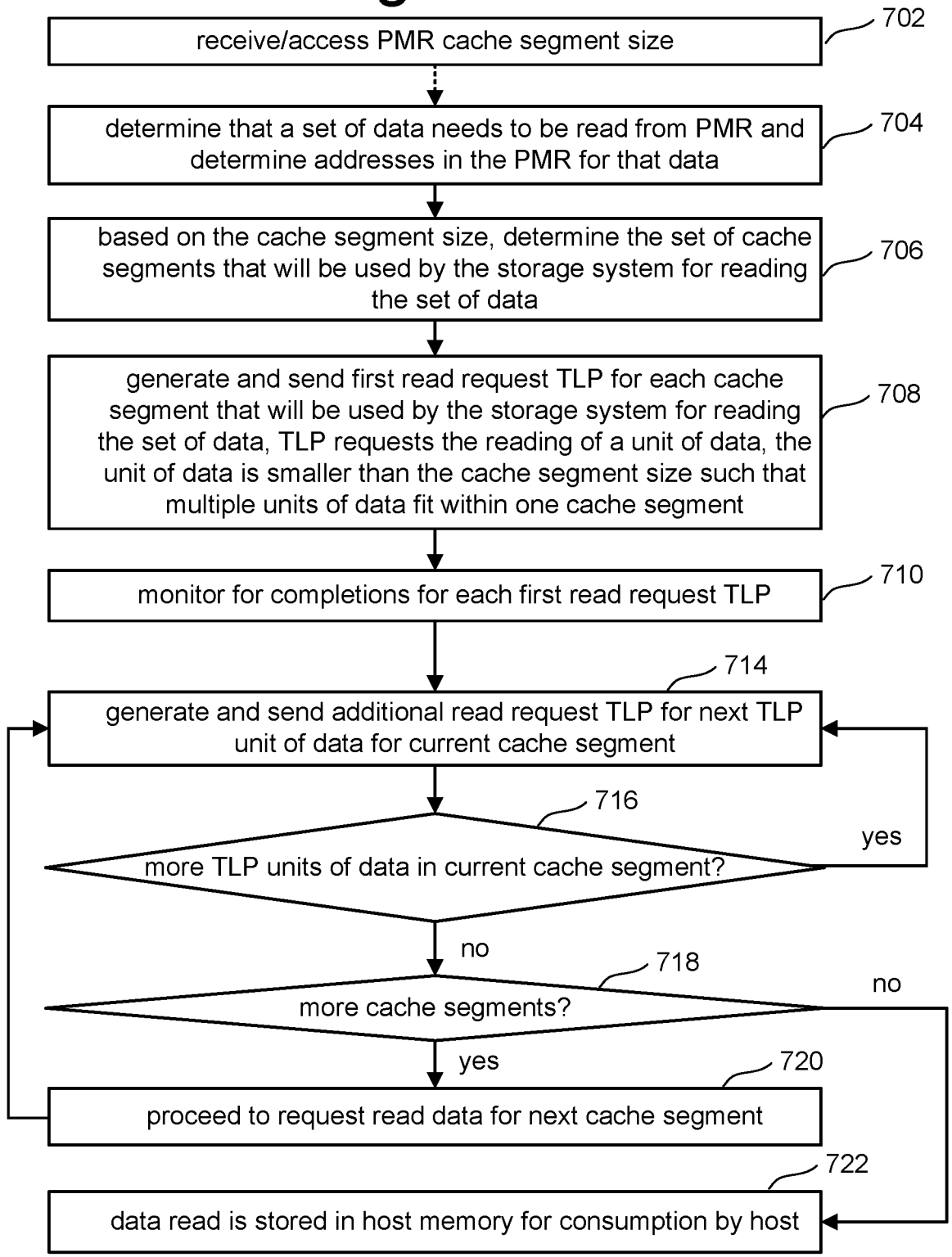

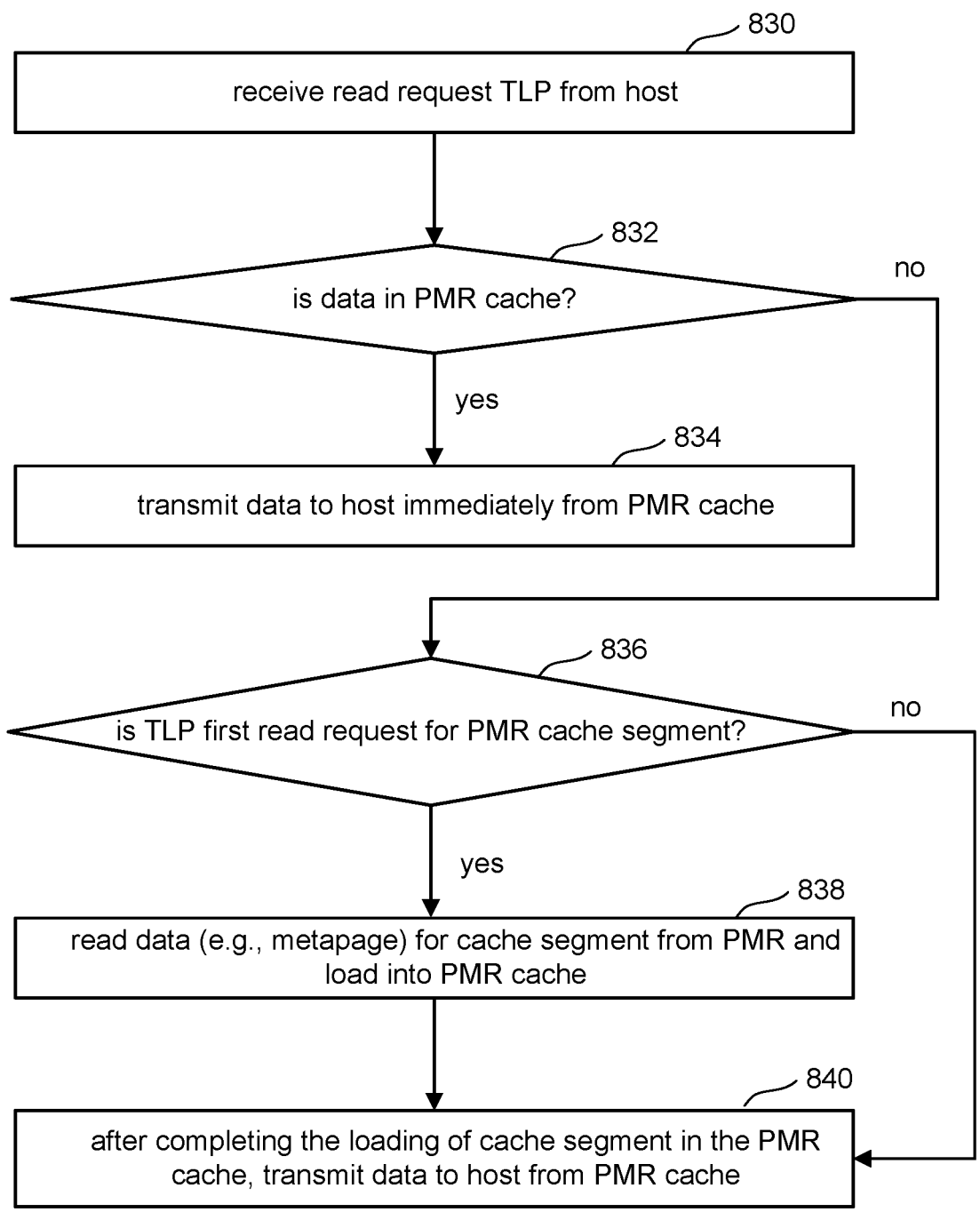

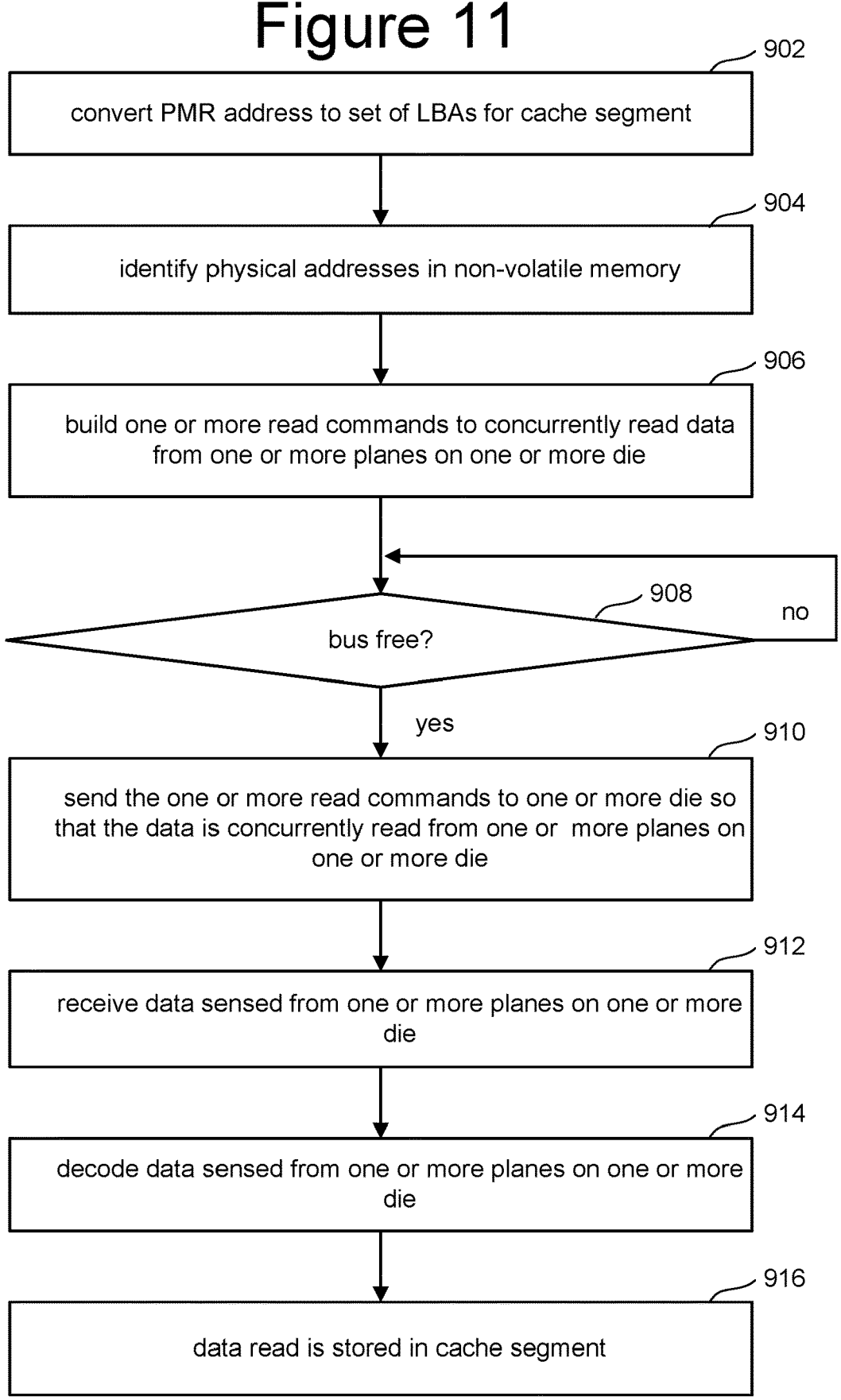

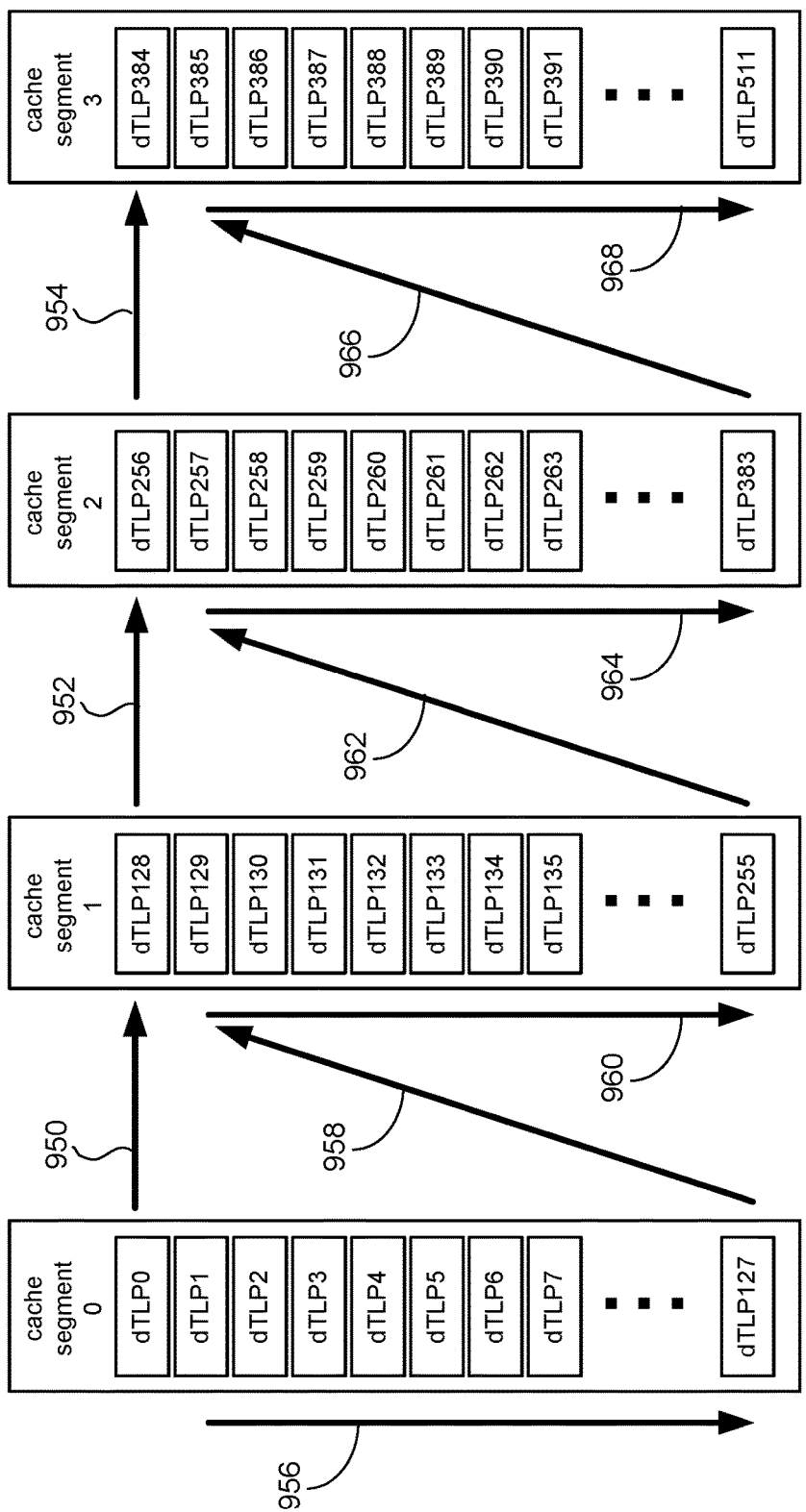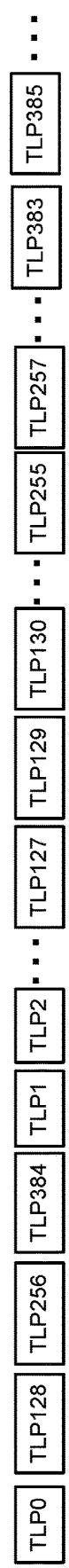
Figure 12A
Figure 12B

US 11,656,994 B2

NON-VOLATILE MEMORY WITH OPTIMIZED READ

BACKGROUND

The present technology relates to the operation of non-volatile memory devices.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a power source (e.g., a battery). One example of non-volatile memory is flash memory (e.g., NAND-type and NOR-type flash memory).

Many electronic devices make use of embedded or connected storage systems that include non-volatile memory. An electronic device that includes an embedded storage system, or is connected to a storage system, is often referred to as a host. Data stored in the embedded or connected storage system can be transferred to the host for use by the host with various applications. For example, a storage system may store a database in non-volatile memory that is used by an application on the host to perform any number of tasks. An application's performance, such as the time needed to perform a task, is important to users of the application. To achieve high performance, applications need to be able to read data from the storage system without delays so that the application is not slowed down due to latency of reading data from the storage system. Therefore, there is a need to increase the speed for reading data from a storage system.

BRIEF DESCRIPTION OF THE DRAWINGS

Like-numbered elements refer to common components in the different figures.

FIG. 1A is a block diagram of one embodiment of a storage system connected to a host.

FIG. 4A depicts one embodiment of the structure of a TLP read request message.

FIG. 4B depicts one embodiment of the structure of a TLP read completion message.

FIG. 5A depicts an a plurality of cache segments and depicts an example order to reading the contents of the cache segments.

FIG. 5B depicts the order of issuing TLP read request messages for the embodiment of FIG. 5A.

FIG. 9 is a flow chart describing one embodiment of a process performed by a host in order to read data from a storage system.

FIG. 10 is a flow chart describing one embodiment of a process performed a storage system when requested to read data by a host.

FIG. 11 is a flow chart describing one embodiment of a process performed by a storage system as part of a read process.

FIG. 12A depicts a plurality of cache segments and an example order to reading the contents of the cache segments.

FIG. 12B depicts the order of issuing TLP read request messages for the embodiment of FIG. 12A.

DETAILED DESCRIPTION

Figure 1B:
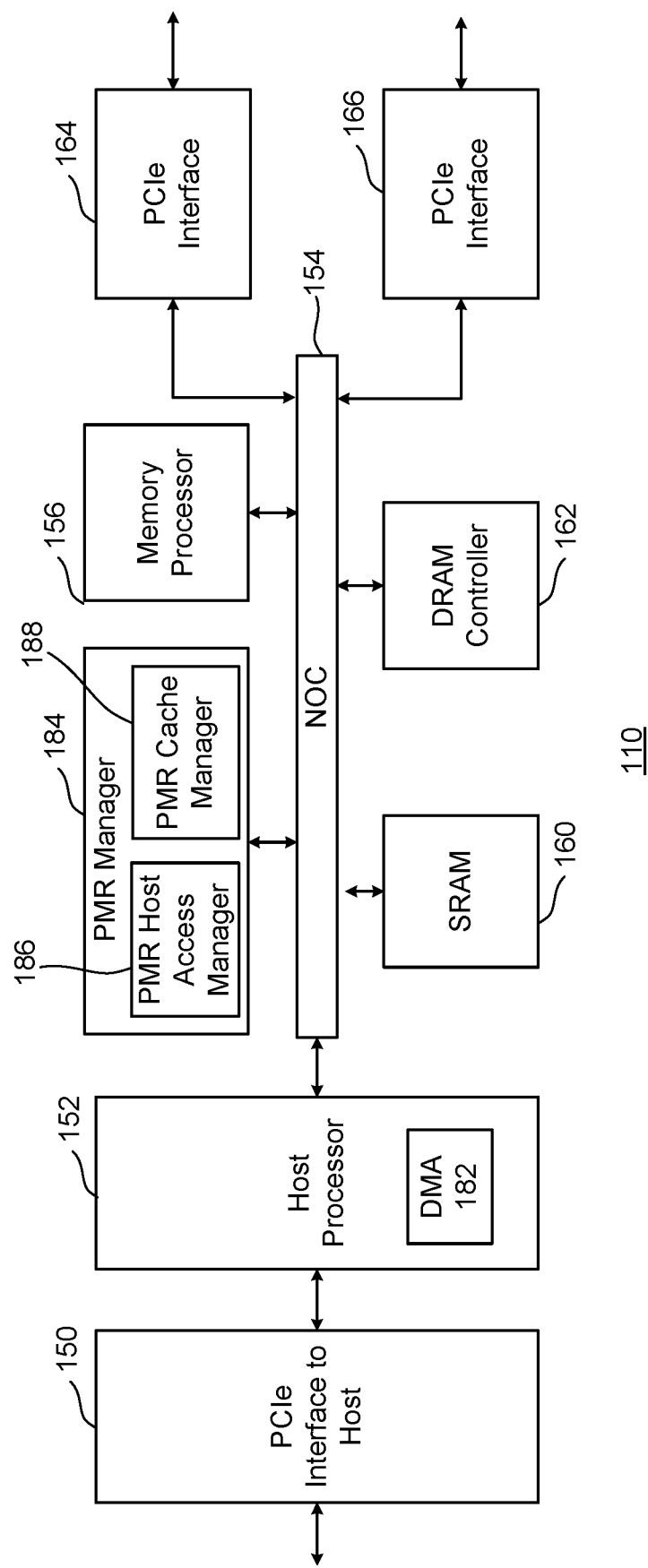
FIG. 1B is a block diagram of one embodiment of a Front-End Processor Circuit.

To increase the speed for reading data from a non-volatile storage system, it is proposed that the non-volatile storage system share details of the structure of its storage region and/or the cache with the host. With awareness of the shared details of the structure of the storage region and/or the cache, the host arranges and sends out requests to read data in a manner that takes advantage of parallelism within the non-volatile storage system.

In one embodiment, a non-volatile storage system implements a persistent memory region ("PMR") that is accessible by a host. To improve performance, the non-volatile storage system also implements a PMR cache that includes a plurality of cache segments. During initialization (or at another point in time), the non-volatile storage system notifies the host of the size of the cache segments (or other information about the PMR and/or the PMR cache). When the host determines that data needs to be read from the PMR, the host uses its knowledge of the size of the cache segments to identify which cache segments of the PMR cache will be used to read the data. The host first sends a single read request to the non-volatile storage system for each of the identified cache segments of the PMR cache that will be used to read the data. In response, the non-volatile storage system loads the data into the identified cache segments of the PMR cache and returns the requested data to the host. Upon receipt of the requested data for a cache segment, the host then sends additional read requests for additional data for that respective cache segment. In this manner, all or a portion of the first set of read requests are performed concurrently with each other as well as with all or a portion of the read requests for additional data. This concurrency improves performance of the read process and results in the data read being delivered to the host in a shorter amount of time.

FIG. 1A is a block diagram of one embodiment of a storage system 100 connected to a host system 120. Storage system 100 can implement the technology disclosed herein. Many different types of storage systems can be used with the technology disclosed herein. One example storage system is a solid-state drive ("SSD"); however, other types of storage systems can also be used. Storage system 100 comprises a memory controller 102, one or more memory package 104 for storing data, and local memory (e.g. DRAM/ReRAM) 106. Memory controller 102 comprises a Front-End Processor Circuit (FEP) 110 and one or more Back-End Processor Circuits (BEP) 112. In one embodiment FEP 110 circuit is implemented on an ASIC. In one embodiment, each BEP circuit 112 is implemented on a separate ASIC. In one embodiment, the ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory package 104 at the request of FEP circuit 110. For example, the BEP circuit 112 can carry out the read, erase, and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit.

In one embodiment, there are a plurality of memory packages 104. Each memory package 104 may contain one or more memory dies. In one embodiment, each memory die in the memory package 104 utilizes NAND flash memory (including two-dimensional NAND flash memory and/or three-dimensional NAND flash memory). In other embodiments, the memory package 104 can include other types of memory; for example, the memory package can include Phase Change Memory (PCM) memory or Magnetoresistive Random Access Memory (MRAM).

In one embodiment, memory controller 102 communicates with host system 120 using an interface 130 that implements NVM Express (NVMe) over PCI Express (PCIe). For working with storage system 100, host system 120 includes a host processor 122, host memory 124, and a PCIe interface 126, which communicate over bus 128. Host memory 124 is the host's physical memory, and can be DRAM, SRAM, non-volatile memory, or another type of storage. Host 120 may also include a hard disk drive connected to bus 128 and/or a USB drive in communication with bus 128. Software (code) for programming host processor 122 can be stored in host memory 124, a hard disk drive connected to bus 128 or a USB drive. Host memory 124, a hard disk drive connected to bus 128, and a USB drive are examples of non-transitory processor readable storage mediums that store processor readable code that when executed on host processor 122 cause host processor 122 to perform the methods described below.

Host system 120 is external to and separate from storage system 100. In one embodiment, storage system 100 is embedded in host system 120. In other embodiments, memory controller 102 may communicate with host 120 via other types of communication buses and/or links, including for example, over an NVMe over Fabrics architecture, or a cache/memory coherence architecture based on Cache Coherent Interconnect for Accelerators (CCIX), Compute Express Link (CXL), Open Coherent Accelerator Processor Interface (OpenCAPI), Gen-Z and the like. For simplicity, the embodiments below will be described with respect to a PCIe example.

FIG. 1B is a block diagram of one embodiment of FEP circuit 110. FIG. 1B shows a PCIe interface 150 to communicate with host system 120 and a host processor 152. PCIe interface 150 includes a direct memory access (DMA) module to perform DMA transfers to host memory 124. Host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use un-clocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106, which is a volatile memory). SRAM 160 is local volatile RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface 164/166 communicates with one of the BEP circuits 112. In other embodiments, there can be more or fewer than two BEP circuits 112; therefore, there can be more than two PCIe Interfaces.

In general, a Persistent Memory Region (PMR) is an area of persistent memory located within storage device 100 that can be accessed by host 120 (e.g., read or write) using standard PCIe commands/transfers, without any of the overhead of command queues that are typical of NVMe. An address range is assigned to the PMR for use by the host with standard PCIe commands/transfers. In various embodiments, the PMR can reside completely in non-volatile memory 104, completely in volatile memory (e.g., DRAM 106 or SRAM 160), or across both non-volatile memory and volatile memory. In one embodiment, storage device 100 implements a PMR within non-volatile memory 104, as described below. Access to the PMR is controlled by PMR Manager 184 (connected to NOC 154), which can be a stand-alone processor (hardwired or programmed by software). In another embodiment, PMR Manager 184 is a software running on Memory Processor 156 or Host Processor 152. PMR Manager 184 includes PMR Host Access Manager 186 and PMR Cache Manager 188, both of which can be dedicated electrical circuits, software or a combination of both. PMR Host Access Manager 186 manages communication with host 120. To increase performance of the PMR, Memory Controller 102 implements a PMR cache to locally store a subset of the PMR at the Memory Controller for faster access. In some embodiments, the PMR cache is implemented in volatile memory such as DRAM 106 or SRAM 160. More details of the PMR cache will be discussed below. PMR Cache Manager 188 manages the PMR cache, reading from non-volatile memory and writing to non-volatile memory 104.

Figure 1C:
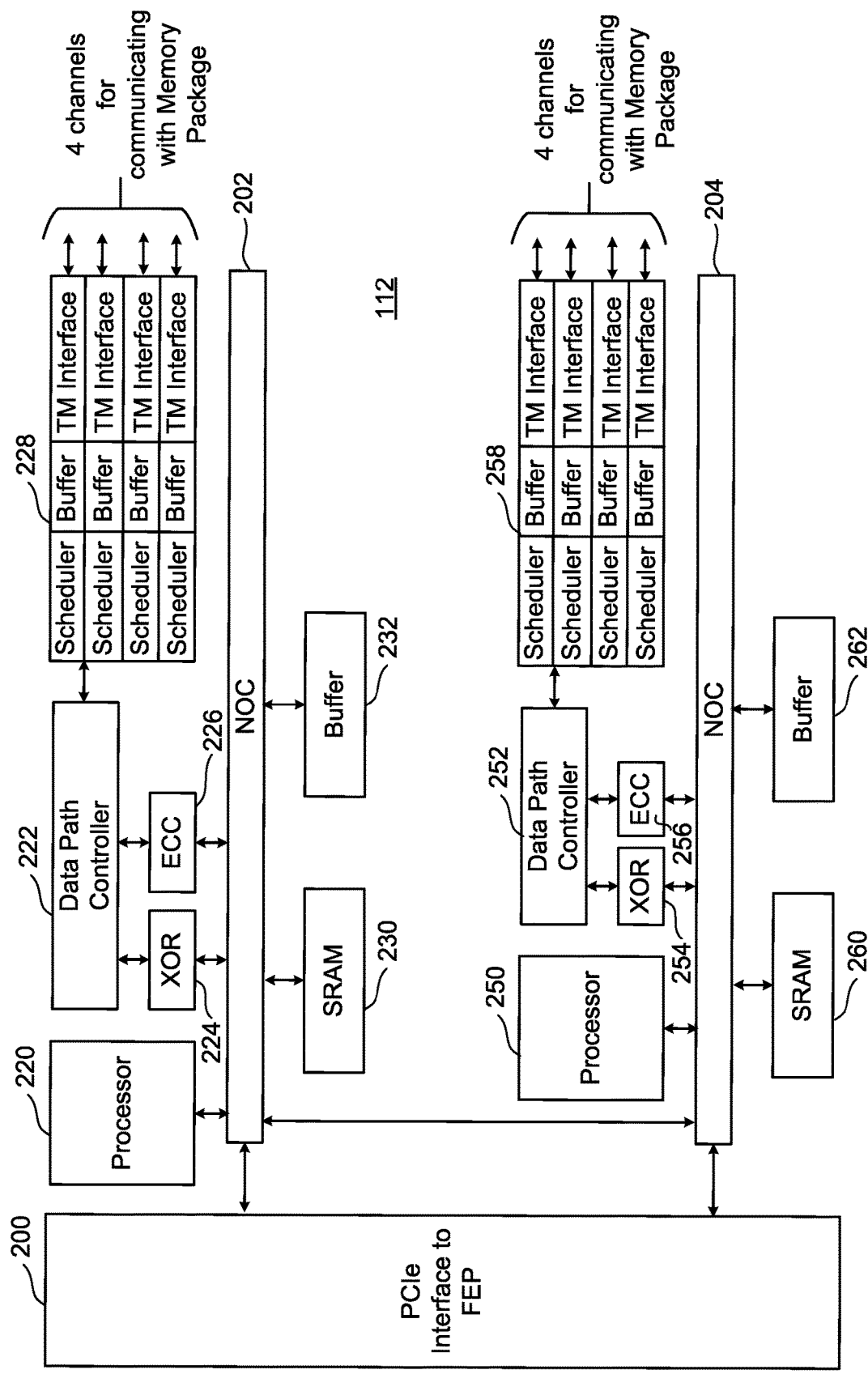
FIG. 1C is a block diagram of one embodiment of a Back-End Processor Circuit.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256).

The ECC engines 226/256 are used to perform error correction, as known in the art. Herein, the ECC engines 226/256 may be referred to as controller ECC engines. The XOR engines 224/254 are used to XOR the data so that data can be combined and stored in a manner that can be recovered in case there is a programming error. In one embodiment, the XOR engines 224/254 can recover data that cannot be decoded using ECC engine 226/256.

Data path controller 222 is connected to a memory interface 228 for communicating via four channels with integrated memory assemblies. Thus, the top NOC 202 is associated with memory interface 228 for four channels for communicating with memory packages and the bottom NOC 204 is associated with memory interface 258 for four additional channels for communicating with memory packages. In one embodiment, each memory interface 228/258 includes four Toggle Mode interfaces (TM Interface), four buffers and four schedulers. There is one scheduler, buffer, and TM Interface for each of the channels. The processor can be any standard processor known in the art. The data path controllers 222/252 can be a processor, FPGA, microprocessor, or other type of controller. The XOR engines 224/254 and ECC engines 226/256 are dedicated hardware circuits, known as hardware accelerators. In other embodiments, the XOR engines 224/254, ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 1C. Additionally, controllers with structures different than FIGS. 1B and 1C can also be used with the technology described herein.

Figure 1D:
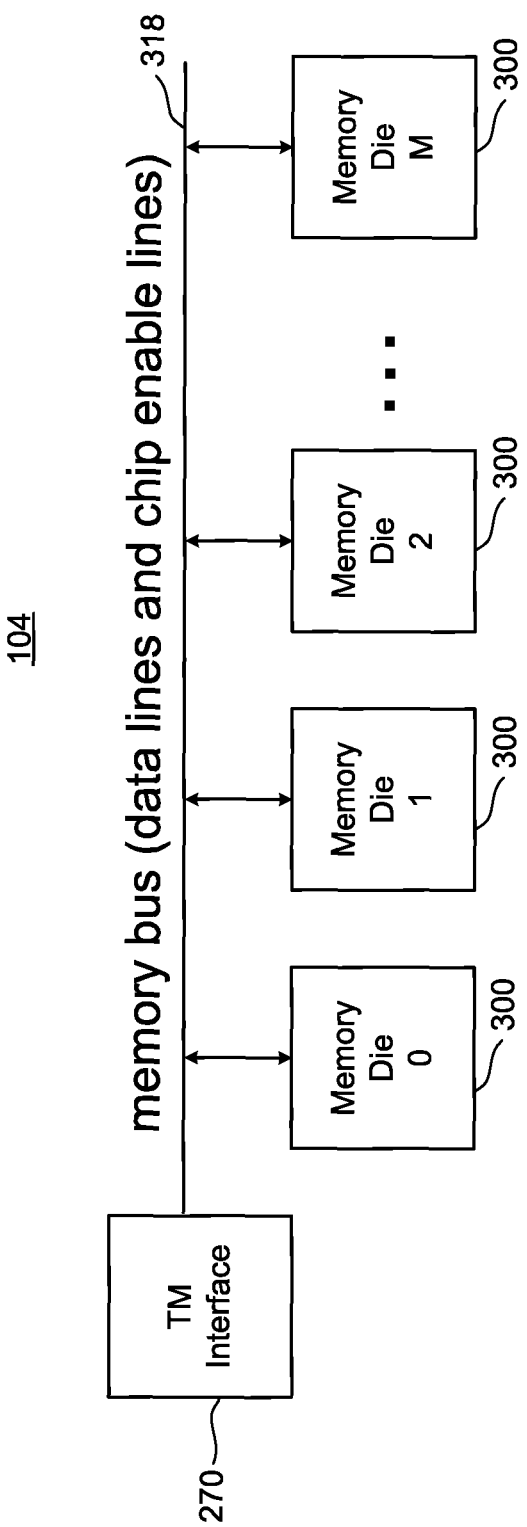
FIG. 1D is a block diagram of one embodiment of a memory package.

FIG. 1D is a block diagram of one embodiment of a memory package 104 that includes a plurality of memory dies 300 (Memory Die 0, Memory Die 1, Memory Die 2, . . . Memory Die M) connected to a memory bus (data lines and chip enable lines) 318. The memory bus 318 connects to a Toggle Mode Interface 270 for communicating with the TM Interface of a BEP circuit 112 (see e.g., FIG. 1C). In some embodiments, the memory package can include a small controller connected to the memory bus 318 and the TM Interface 270. In total, the memory package 104 may have eight or 16 memory die; however, other numbers of memory die can also be implemented. The technology described herein is not limited to any particular number of memory die. In some embodiments, the memory package can also include a processor, CPU device, such as a RISC-V CPU along with some amount of RAM to help implement some of capabilities described below. The technology described herein is not limited to any particular number of memory die.

Figure 1E:
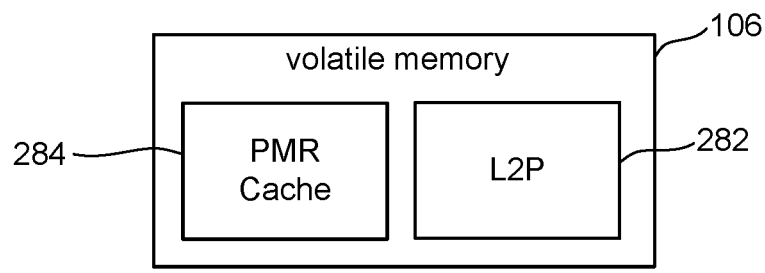
FIG. 1E is a block diagram of one embodiment of a volatile memory used with a memory controller.

FIG. 1E is a block diagram of one embodiment of a volatile memory used with a memory controller 102. In one embodiment, the volatile memory of FIG. 1E is DRAM 106.

In many storage systems, the non-volatile memory is addressed internally to the memory system using physical addresses associated with one or more memory die. However, the host will use logical addresses to address the various memory locations. This enables the host to assign data to consecutive logical addresses, while the memory system is free to store the data as it wishes among the locations of the one or more memory die. To enable this system, the memory controller typically performs translation between the logical addresses used by the host and the physical addresses used by the memory die ("address translation"). One example implementation is to maintain data structures that identify the current translation between logical addresses and physical addresses. One example of such a data structure is referred to as a L2P table. For purposes of this document, a L2P table is a data structure that identifies translation between logical addresses and physical addresses. The L2P table does not need to literally be a table, and many different forms of a data structure can function as and be referred to as a L2P table as long as they enable translation of a logical address to a physical address. For purposes of this document, the one or more data structures that enable translation of logical addresses to physical addresses can be referred to as one L2P table or multiple L2P tables. For example, the data structure can be broken up into blocks or other units.

In one embodiment, host 120 can address the non-volatile memory using logical block addresses. Memory controller 102 can use its L2P tables to translate between logical block addresses used by host 120 and physical block addresses used within non-volatile memory 104.

Typically, memory controller 102 uses DRAM 106 to store all or a portion of the L2P tables. In some examples, the memory space of a memory system is so large that DRAM 106 cannot hold all of the L2P tables as well as any other information (besides L2P tables) that DRAM 106 is used to store. In such a case, the entire set of L2P tables are stored in the non-volatile memory 104 and a subset of the L2P tables are cached in the local memory (referred to as L2P cache). FIG. 1E shows DRAM 106 storing L2P cache 282.

In one set of embodiments, storage system 100 implements a PMR. To increase performance of the PMR, Memory Controller 102 implements a PMR cache 284 to locally store a subset of the PMR at the Memory Controller for faster access. In some embodiments, the PMR cache 282 resides in DRAM 106. In another embodiment, the L2P tables 282 and the PMR cache 284 reside in SRAM 160.

Figure 1F:
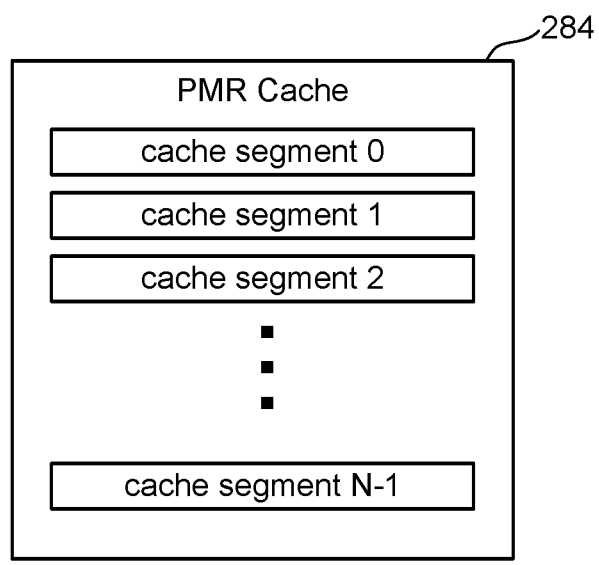
FIG. 1F is a block diagram of one embodiment of a PMR cache.

FIG. 1F is a block diagram of one embodiment of PMR cache 284 that is divided into cache segments. For example, FIG. 1F shows N cache segments: cache segment 0, cache segment 1, cache segment 2, . . . cache segment N−1. Each cache segment represents a portion of the PMR and stores recently accessed data of the PMR. When memory controller 102 reads data from the PMR, the data read is first stored in the PMR cache 284 and then transferred to the host. If the data is needed again, then memory controller can access the data from PMR cache 284 rather than reading from the PMR itself, if the data still in the PMR cache. When memory controller 102 writes data to the PMR, the data to be written is first stored in the PMR cache 284 and then transferred to the PMR. In one embodiment, each cache segment is of the same size, which is referred to as the cache segment size. In another embodiment, a subset of the cache segments are sized at a common cache segment size and other cache segments can be of a different size.

Figure 2A:
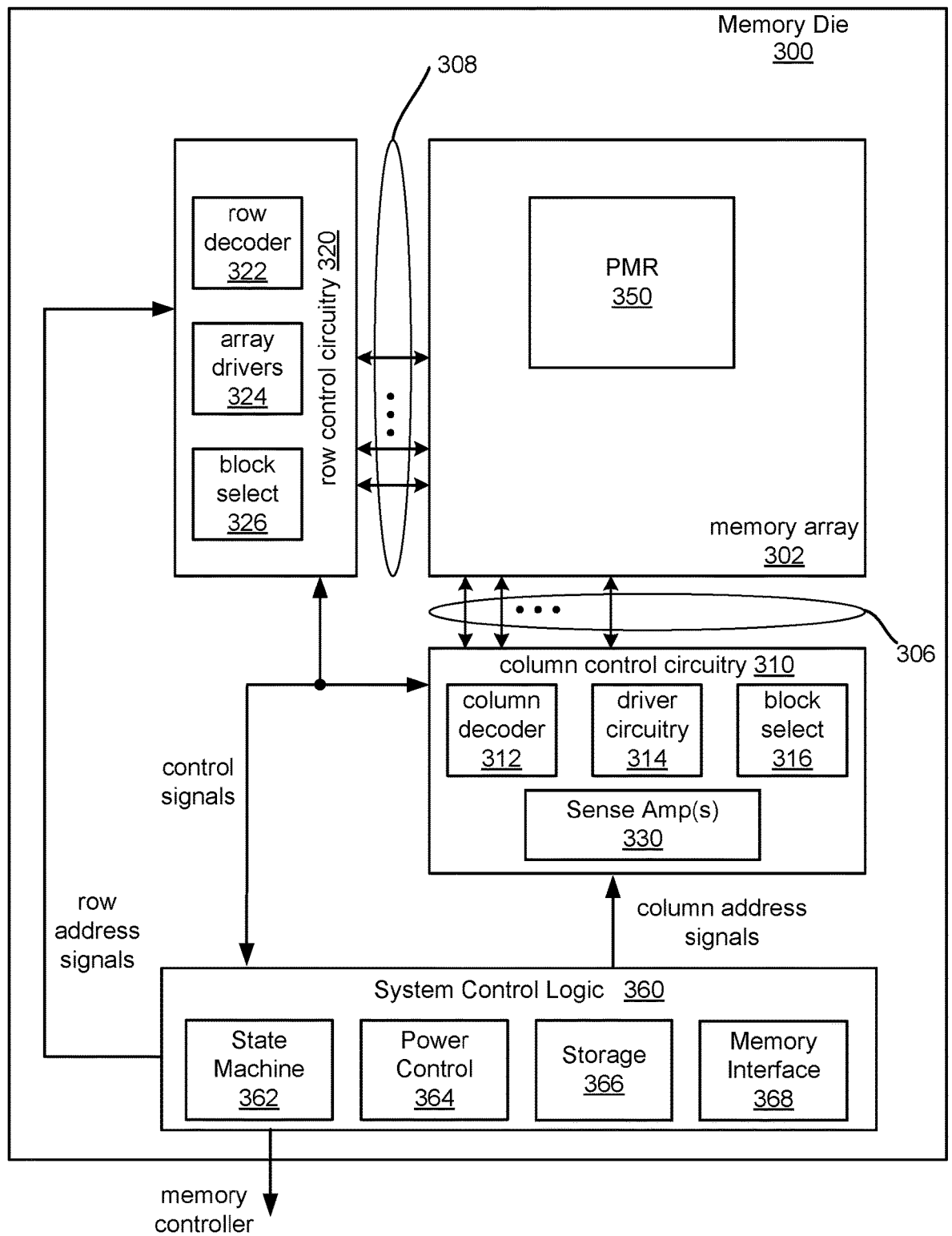
FIG. 2A is a functional block diagram of an embodiment of a memory die.

FIG. 2A is a block diagram that depicts one example of a memory die 300 that can implement the technology described herein. Memory die 300, which can correspond to one of the memory die 300 of FIG. 1C, includes a non-volatile memory array 302. All or a portion of memory array 302 is used as a PMR 350. In one embodiment, PMR 350 resides on one memory die 300. In another embodiment, the PMR 350 resides across multiple memory die 300. The array terminal lines of memory array 302 include the various layer(s) of word lines organized as rows, and the various layer(s) of bit lines organized as columns. However, other orientations can also be implemented. Memory die 300 includes row control circuitry 320, whose outputs 308 are connected to respective word lines of the memory array 302. Row control circuitry 320 receives a group of M row address signals and one or more various control signals from System Control Logic circuit 360, and typically may include such circuits as row decoders 322, array terminal drivers 324, and block select circuitry 326 for both reading and writing operations. Row control circuitry 320 may also include read/write circuitry. Memory die 300 also includes column control circuitry 310 including sense amplifier(s) 330 whose input/outputs 306 are connected to respective bit lines of the memory array 302. Although only single block is shown for array 302, a memory die can include multiple arrays and/or multiple planes that can be individually accessed. Column control circuitry 310 receives a group of N column address signals and one or more various control signals from System Control Logic 360, and typically may include such circuits as column decoders 312, array terminal receivers or drivers 314, block select circuitry 316, as well as read/write circuitry, and I/O multiplexers.

System control logic 360 receives data and commands from host 120 and provides output data and status to the controller 102. In some embodiments, the system control logic 360 include a state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. The system control logic 360 can also include a power control module 364 that controls the power and voltages supplied to the rows and columns of the memory array 302 during memory operations and may include charge pumps and regulator circuit for creating regulating voltages. System control logic 360 includes storage 366, which may be used to store parameters for operating the memory array 302.

Commands and data are transferred between memory controller 102 and memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used. For example, memory controller interface 368 may implement a Toggle Mode Interface that connects to the Toggle Mode interfaces of memory interface 228/258 for memory controller 102. In one embodiment, memory controller interface 368 includes a set of input and/or output (I/O) pins that connect to the memory controller 102.

In some embodiments, all the elements of memory die 300, including the system control logic 360, can be formed as part of a single die. In other embodiments, some or all of the system control logic 360 can be formed on a different die.

For purposes of this document, the phrase "one or more control circuits" can include any one or a combination of memory controller 102, state machine 362, a micro-controller, micro-processor, all of or a portion of system control logic 360, row control circuitry 320, column control circuitry 310 and/or other analogous circuits that are used to control non-volatile memory. The one or more control circuits can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

In one embodiment, memory structure 302 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 302 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory array 302. No particular non-volatile memory technology is required for purposes of the new claimed embodiments proposed herein. Other examples of suitable technologies for memory cells of the memory array (or other type of memory structure) 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts, the structure of memory array 302 and the peripheral circuitry, which (in some embodiments) includes all of the structures 310, 320 and 360 other than memory array 302. An important characteristic of a memory circuit is its capacity, which can be increased by increasing the area of the memory die of storage system 100 that is given over to the memory structure 302; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the storage system 100 is the amount of area to devote to the memory structure 302 and the amount of area to devote to the peripheral circuitry.

Another area in which the memory array 302 and the peripheral circuitry are often at odds is in the processing involved in forming these regions, since these regions often involve differing processing technologies resulting in trade-offs in having differing technologies on a single die. For example, when the memory array 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 2A onto separately formed dies that are then bonded together. More specifically, the memory array 302 can be formed on one die (the memory die) and some or all of the peripheral circuitry elements, including one or more control circuits, can be formed on a separate die (the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one control die, other embodiments can use more die, such as two memory die and one peripheral circuitry die, for example.

Figure 2B:
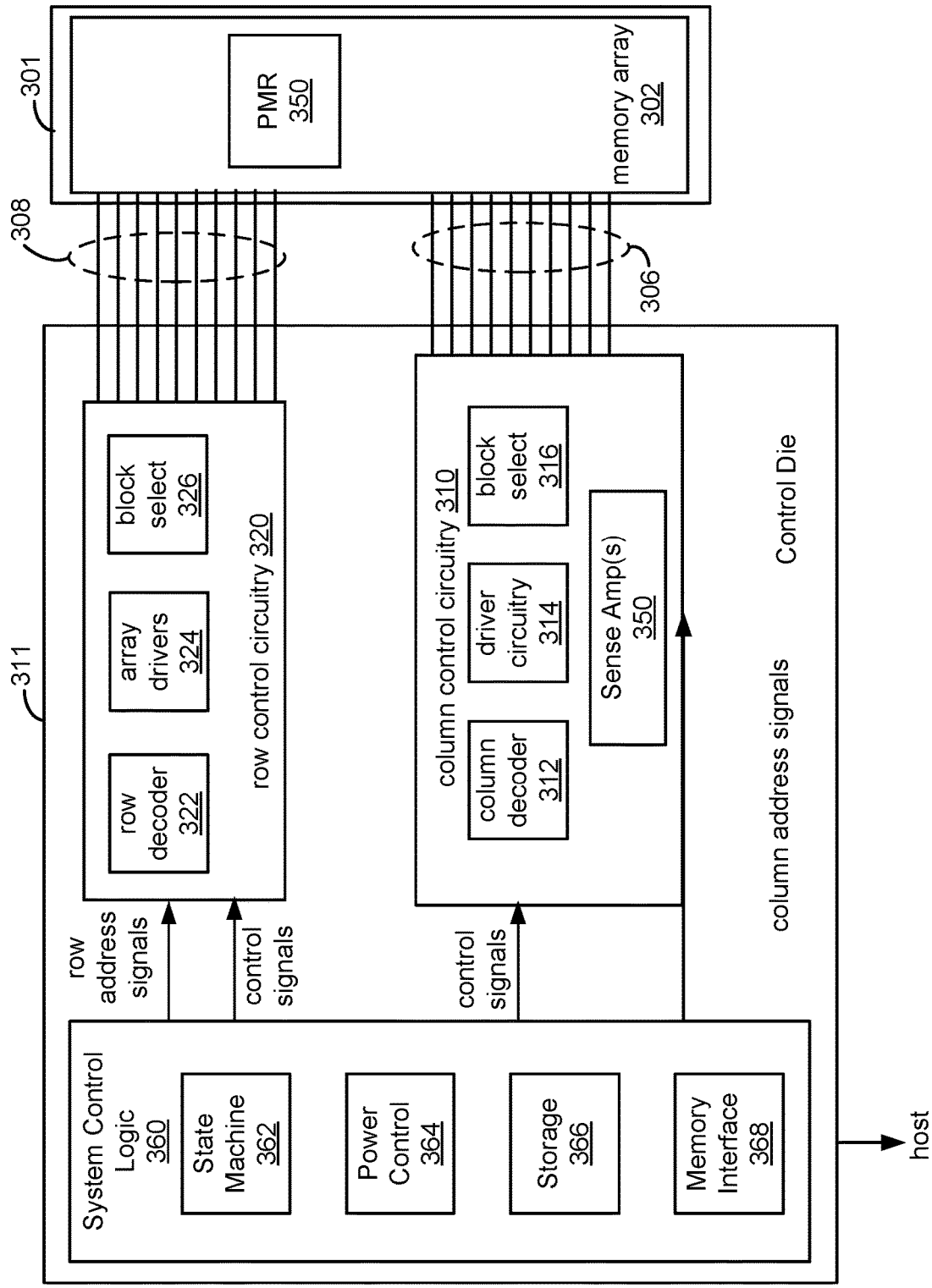
FIG. 2B is a functional block diagram of an embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 307. One or more integrated memory assemblies 307 may be used in a memory package 104 in storage system 100. The integrated memory assembly 307 includes two types of semiconductor die (or more succinctly, "die"). Memory die 301 includes memory array 302. Memory array 302 may contain non-volatile memory cells. All or a portion of memory array 302 is used as a PMR 350. In one embodiment, PMR 350 resides in memory array 302 on memory die 301 of integrated memory assembly 307. In one embodiment, PMR 350 resides within one memory array or within one memory die. In another embodiment, the PMR 350 resides across multiple memory die 300 and/or across multiple integrated memory assemblies 307.

Control die 311 includes control circuitry 310, 320 and 360 (details of which are discussed above). In some embodiments, control die 311 is configured to connect to the memory array 302 in the memory die 301. FIG. 2B shows an example of the peripheral circuitry, including control circuits, formed in a peripheral circuit or control die 311 coupled to memory array 302 formed in memory die 301. Common components are labelled similarly to FIG. 3A. System control logic 360, row control circuitry 320, and column control circuitry 310 are located in control die 311. In some embodiments, all or a portion of the column control circuitry 310 and all or a portion of the row control circuitry 320 are located on the memory die 301. In some embodiments, some of the circuitry in the system control logic 360 is located on the on the memory die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory die 301 may reduce the number of steps needed to fabricate such a die, adding such circuits to a die such as control die 311 may not require many additional process steps.

FIG. 2B shows column control circuitry 310 including sense amplifier(s) 350 on the control die 311 coupled to memory array 302 on the memory die 301 through electrical paths 306. For example, electrical paths 306 may provide electrical connection between column decoder 312, driver circuitry 314, and block select 316 and bit lines of memory array (or structure) 302. Electrical paths may extend from column control circuitry 310 in control die 311 through pads on control die 311 that are bonded to corresponding pads of the memory die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory array 302 through electrical paths 308. Each of electrical path 308 may correspond to a word line, dummy word line, or select gate line. Additional electrical paths may also be provided between control die 311 and memory structure die 301.

In some embodiments, there is more than one control die 311 and/or more than one memory die 301 in an integrated memory assembly 307. In some embodiments, the integrated memory assembly 307 includes a stack of multiple control die 311 and multiple memory structure die 301. In some embodiments, each control die 311 is affixed (e.g., bonded) to at least one of the memory structure dies 301.

Figure 3:
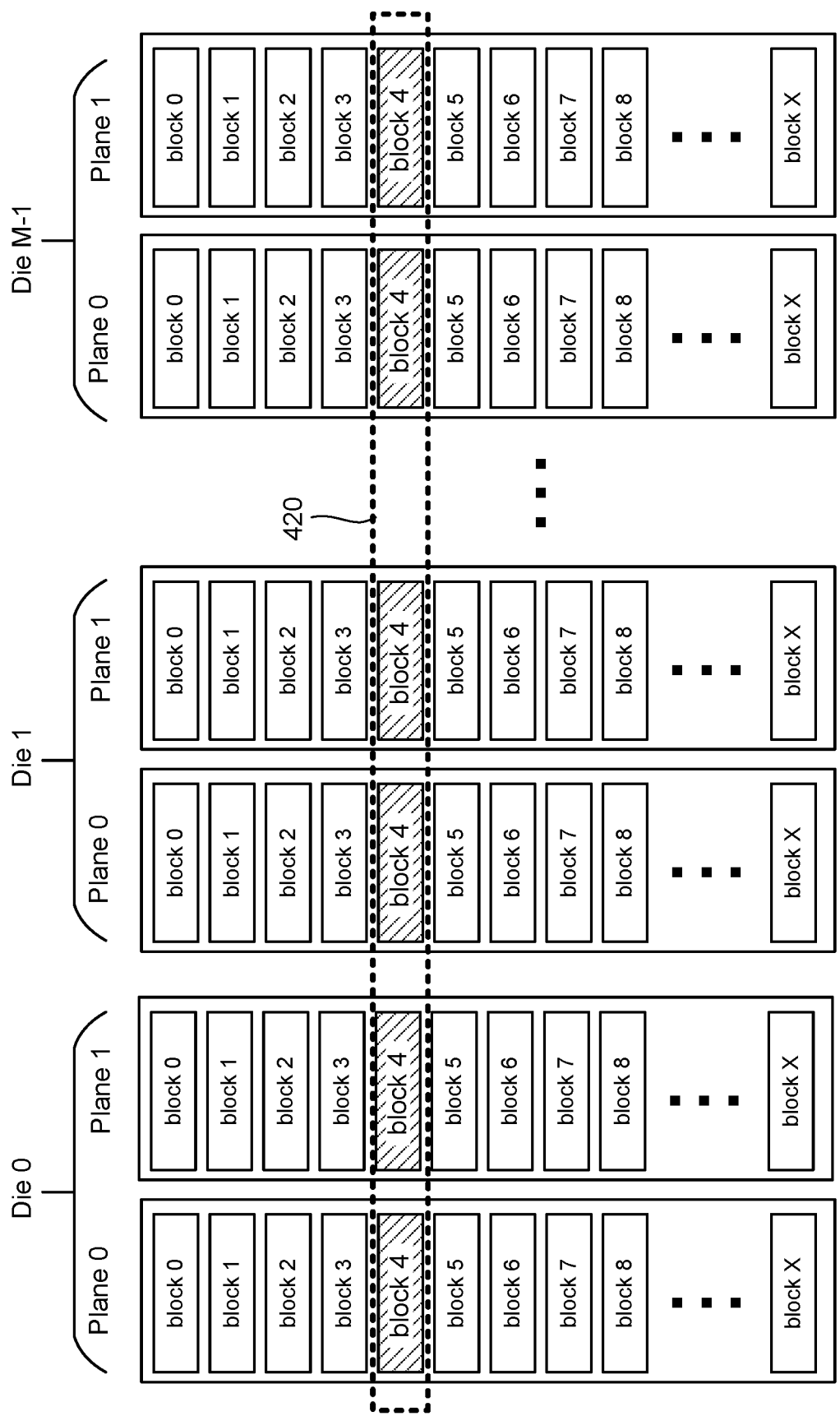
FIG. 3 depicts an example of a metablock.

FIG. 3 depicts an example of a metablock that resides across M dies (Dies 0, Die 1, . . . Die M-1). In the embodiment of FIG. 3, each memory die includes two planes of memory cells (Plane 0 and Plane 1). However, in other embodiment, each memory die includes one plane of memory cells or more than two planes of memory cells. The exact number of planes is not limited for the technology described herein. In the embodiment of FIG. 3, each plane includes X+1 physical blocks of memory cells (block 0, block 1, . . . block X). In one embodiment, memory controller groups physical blocks from each plane into a metablock. For example, FIG. 3 shows metablock 420 comprising block 4 from each plane; therefore, metablock 420 comprises M*2 physical blocks. In one embodiment, each block includes a set of word lines connecting to all of the NAND strings of that block. Each block also includes a set of bit lines such that one bit line connects to a subset of NAND strings for that block (e.g., one bit line connects to one NAND string, four NAND strings, six NAND strings, eight NAND strings, etc., depending on the architecture).

In one embodiment, the unit of erase is a physical block. That is, an entire physical block is erased at the same time.

In one embodiment, the unit of programming and the unit of reading is a physical page. That is, a physical page represents the number of data bits programmed or read concurrently. In one embodiment, a physical page includes all data stored in all memory cells of a same physical block that are connected to a same word line. In other embodiments, a physical page includes a subset of data stored in all memory cells of a same physical block that are connected to a same word line. For example, a physical page may include data stored in ½ (or other fraction) of the memory cells of a same physical block that are connected to a same word line. In one example implementation, a physical page is equal to 4 KB. In one set of embodiments that uses meta- blocks, the memory controller can write data to and read data from a metapage such that a metapage includes a physical page from each physical block of a metablock. In the example above where metablock 420 comprises M*2 physical blocks the metapage comprises pages from M*2 physical blocks and, therefore, stores M*2*4 KB of data. As discussed above with respect to FIG. 1F, PMR cache 284 includes a set of cache segments. In one embodiment, each cache segment stores data from one metapage. Thus, each cache segment has a cache segment size of M*2*4 KB. In other embodiments, a cache segment can store data for one page from one physical block, from multiple metapages, or other amounts.

As discussed above, storage system 100 implements a PMR that can be accessed by host 120 (e.g., read or write) using standard PCIe commands. In PCIe terms, a commands is included in a Transaction Layer Packet ("TLP"), which refers to the transaction layer of the PCIe communications mechanism (transaction layer, data link layer and physical layer). With read operations, two packets are involved: one TLP (e.g., the read request TLP) from the host 120 to the storage system 100 asking the latter to perform a read operation, and one TLP (e.g., the completion TLP) going back from storage system 100 to host 120 with the data. The TLP (the read request TLP) from the host 120 to the storage system 100 asking the latter to perform a read operation is depicted in FIG. 4A. The TLP (the completion TLP) going back from storage system 100 to host 120 with the data is depicted in FIG. 4B.

The read request TLP depicted in FIG. 4A is generated by the host 120 (e.g., host processor 122 or a memory controller chipset of the host or another component of the host), which is sometimes referred to as the Root Complex. The fields of the read request TLP are:
  the fields marked R are reserved.
  the FMT field, together with the Type field, indicate that this is a Memory Read Request.
  the TC field, EP field and ATTR fields are set to zero for Memory Read Requests.
  the TD bit indicates whether there is extra CRC on the TLP data.
  the Length field indicates the number of Double Words (32-bit word) of data to be read.
  the Requester ID field identifies the sender of this packet. When set to zero, the sender is the Root Complex.
  the Tag field has the function of a tracking number: When the storage system responds, it must copy this value to the completion TLP. This allows the Requester/Host to match completion answers with its Request.
  the 1st BE field (1st Double-Word Byte Enable) allows to choose which of the four bytes in the first data Double Word are valid. (e.g., set as 0xf indicates that all four bytes are valid).
  the Address field is the address in the PMR to read from.

When storage device 100 (e.g., memory controller 102) receives a Read Request TLP, it responds with a completion TLP. That is, storage device 100 reads the chunk of data from PMR 350 and returns the result back to host 120. That result includes the completion TLP depicted in FIG. 4B. The fields of the completion TLP are:
  the fields marked R are reserved;
  the FMT field, together with the Type field, indicate that this is a Completion packet with data.
  the Length field indicates the number of double words of data being transmitted.
  the Byte Count field indicates the number of bytes left for transmission, including those in the current packet.

the Lower Address field is the seven least significant bits of the address, from which the first byte in this TLP was read.

the Completer ID identifies the sender of this TLP.

the Requester ID identifies the receiver of this TLP.

the Status field indicates whether the Completion was successful.

the BCM field is always zero, except when a packet originates from a bridge with PCI-X;

the Data field is the data that was read and is being returned. The data is a set of double words. FIG. 4B only shows one double word, but more than one double word can be returned.

In one embodiment, host 120 sends read request TLPs for 256 bytes of data, which is 64 double words, so the Length field of the read request TLP is set to 64. In another embodiment, host 120 sends read request TLPs for 512 bytes of data, which is 128 double words, so the Length field of the read request TLP is set to 128. In other embodiments, the host can send read requests for different amounts of data. The amount of data requested by a read request TLP is referred to herein as a TLP unit of data.

As discussed above, in one embodiment each cache segment of PMR cache 284 has a cache segment size of M*2*4 KB (where M is the number of dies). In an example implementation where a metablock is across sixteen dies, the cache segment size is (16*2*4 KB) 128 KB, which is significantly larger than the amount of data requested in a TLP unit of data. In another embodiment, the cache segment size is 64 KB. Thus, in some embodiments, the TLP unit of data is smaller than the cache segment size such that multiple TLP units of data fit within one cache segment.

Because the unit of data requested by the read request TLP is a different size than the cache segment size, the host is typically not aware of the how the PMR cache is structured and operated, and host side application that use the PMR are not optimized for how the non-volatile memory is managed, host side application may access the PMR inefficiently (e.g., not take advantage of parallelism in the storage system, thereby reducing performance). For example, a loop which iterates over a large buffer in the PMR and performs a transformation on each double word within the buffer will create individual memory accesses for each double word thus flooding the PCIe link with tiny requests. Since each request to a page (physical page or metapage) may trigger one or more operations on non-volatile memory 104, a caching layer is required to align small requests to flash constraints. Similarly, iterations at a page boundary may cause inefficiencies in loading. Since the PCIe TLP size is considerably lower than the page size, reading or writing in a serial fashion may lead to queue bursts and overflows within the PCIe layer as new pages are swapped in and out of the caching mechanism used to coalesce reads and writes.

FIG. 5A depicts a plurality of cache segments and provides an example of a host (that is not using the technology proposed herein) accessing the PMR inefficiently (e.g., not take advantage of parallelism in the storage system, thereby reducing performance). FIG. 5A shows four cache segments: cache segment 0, cache segment 1, cache segment 2 and cache segment 3. Four cache segments are depicted for example purposes only. A PMR cache is likely to have more than four cache segments. The exact number of cache segments is implementation dependent. In the example of FIG. 5A, each cache segment stores the equivalent of 128 TLP units of data. FIG. 5A labels the data in the cache segments based on the order that the host is requesting the TLP unit of data, for this example. The first TLP unit of data requested by the host is labeled dTLP0, the second TLP unit of data requested by the host is labeled dTLP1, the third TLP unit of data requested by the host is labeled dTLP2, . . . the five hundred and twelfth TLP unit of data requested by the host is labeled dTLP511. The order of that the host requests the TLP units of data is graphically depicted in order by arrows 470, 472, 474, 476, 478, 480 and 482. FIG. 5B depicts the read request TLPs, in the order that they are issued by host 120, that are requesting the TLP units of data depicted in FIG. 5A. For example, TLP0 requests dTLP0, TLP1 requests dTLP1, TLP2 requests dTLP2, etc.

When storage system 100 receives TLP0 (a read request TLP), PMR Host Access Manager 186 translates the address in TLP0 to an LBA (logical block address) and sends that LBA to memory processor 156 (see FIG. 1B) to determine the appropriate physical addresses in the non-volatile memory. Controller 120 will read an entire metapage from the non-volatile memory and store that metapage in cache segment 0 as dTLP0, dTLP1, . . . dTLP127. When the data in cache segment 0 is stored, then dTLP0 is returned (from cache segment 0 rather than from the non-volatile memory) in a completion TLP in response to TLP0. Prior to PMR Cache Manager 188 completing the storage of dTLP0, dTlP1, . . . dTLP127 into cache segment 0, it is likely that storage system 100 will have received additional TLPs (e.g., TLP1, TLP2, TLP3 and maybe more). Those additional TLPs will not be responded to until the storage of dTLP0, dTlP1, . . . dTLP127 into cache segment 0 is completed. Host 120 will continue sending TLPs. There is a limit on the number of TLPs that can be pending. When TLP128 is received, the data for that TLP (ie dTLP128) will not already be in the PMR cache; therefore, storage system 100 will need to read the data from non-volatile memory and load it into the PMR cache. However, as discussed above, storage system will not just read the data requested by TLP128. Rather, storage system will read a metapage of data and fill cache segment 1 with that metapage resulting in dTLP128-dTLP255 being stored in cache segment 1. So the read request embodied in TLP128 will have to wait while cache segment 1 is being loaded. TLP256 and TLP384 will experience the same delays, as they wait for the next metapage to be loaded into the PMR cache. Thus, every time a TLP crosses a metapage boundary, or a cache segment boundary, there is a pause or delay in sending out completion TLPs with the requested data. This pause slows down the read process performance.

To overcome this reduction in read process performance, it is proposed that storage system 100 share details of the structure of PMR 350 and/or PMR cache 284 with the host. With awareness of the shared details of the structure of PMR 350 and/or PMR cache 284, host 120 can arrange and send out read request TLPs in a manner that takes advantage of parallelism within storage system 100. One example of a detail of PMR 350 and/or PMR cache 284 is the cache segment size. If host 120 is aware of the cache segment size, it can send read requests in a manner that is more efficient than described above with respect to FIG. 5A, For example, host 120 can take advantage of the parallelism built into storage system 100. More details are provided below with respect to FIGS. 6-12B.

Figure 6:
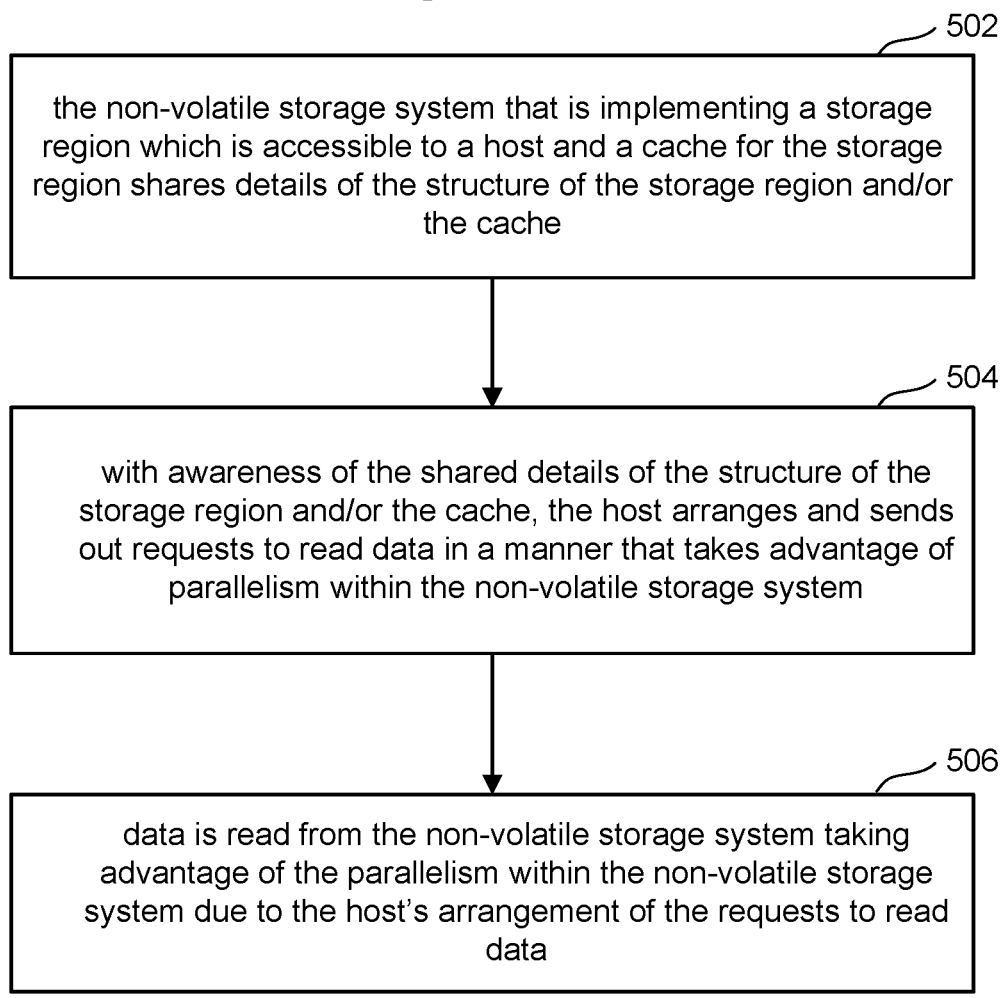
FIG. 6 is a flow chart describing one embodiment of a process for reading data.

FIG. 6 is a flow chart describing one embodiment of a process for reading data. In step 502, non-volatile storage system 100 that is implementing a storage region (e.g., PMR) which is accessible to a host 120 and a cache for the storage region (e.g., PMR cache) shares details of the structure of the storage region and/or the cache with host 120. For example, storage system 100 informs host 120 of the cache segment size. Note that although one example of a storage region is a PMR, other types of storage regions can also be used with the technology described herein. In step 504, with awareness of the shared details of the structure of the storage region and/or the cache, host 120 arranges and sends out requests to read data (e.g., read request TLPs) in a manner that takes advantage of parallelism within non-volatile storage system 100. In step 506, data is read from storage system 100 taking advantage of the parallelism within storage system 100 due to the host's arrangement of the requests to read data. For example, in step 504 host 120 can send out read request TLPs for the different cache segments in advance of sending out the bulk of the read request TLPs. In one embodiment, when the host needs to read a large amount of data, the host will initially issue only a single TLP for each cache segment. Once all (or a portion) of the data is loaded in the cache segment(s), host 120 will send out the additional read request TLPs. Using FIG. 5A as an example, host 120 will initially send TLP0, TLP128, TLP 256 and TLP 384 to storage system 100. Upon receipt of TLP0, TLP128, TLP 256 and TLP 384, storage system 100 will read the data for cache segment 0, cache segment 1, cache segment 2 and cache segment 3 and load the data (dTLP1. dTLP1, . . . dTLP511) into the respective cache segments. Responding to TLP0 causes storage system 100 to read a full metapage that includes dTLP0, dTLP1, . . . dTLP127 and load that data into cache segment 0. Responding to TLP128 causes storage system 100 to read a full metapage that includes dTLP128, dTLP129, . . . dTLP255 and load that data into cache segment 1. Responding to TLP256 causes storage system 100 to read a full metapage that includes dTLP256, dTLP257, . . . dTLP383 and load that data into cache segment 2. Responding to TLP384 causes storage system 100 to read a full metapage that includes dTLP384, dTLP385, . . . dTLP511 and load that data into cache segment 3. In one embodiment. the process of reading and loading the data for cache segment 0, cache segment 1, cache segment 2 and cache segment 3 is performed in parallel (concurrently) by storage system 100. In another embodiment, the process of reading and loading the data for cache segment 0, cache segment 1, cache segment 2 and cache segment 3 is performed serially. Even if performed serially, the data for cache segment 1 is likely to be loaded into cache segment 1 prior to storage system 100 receiving TLP129.

Figure 7:
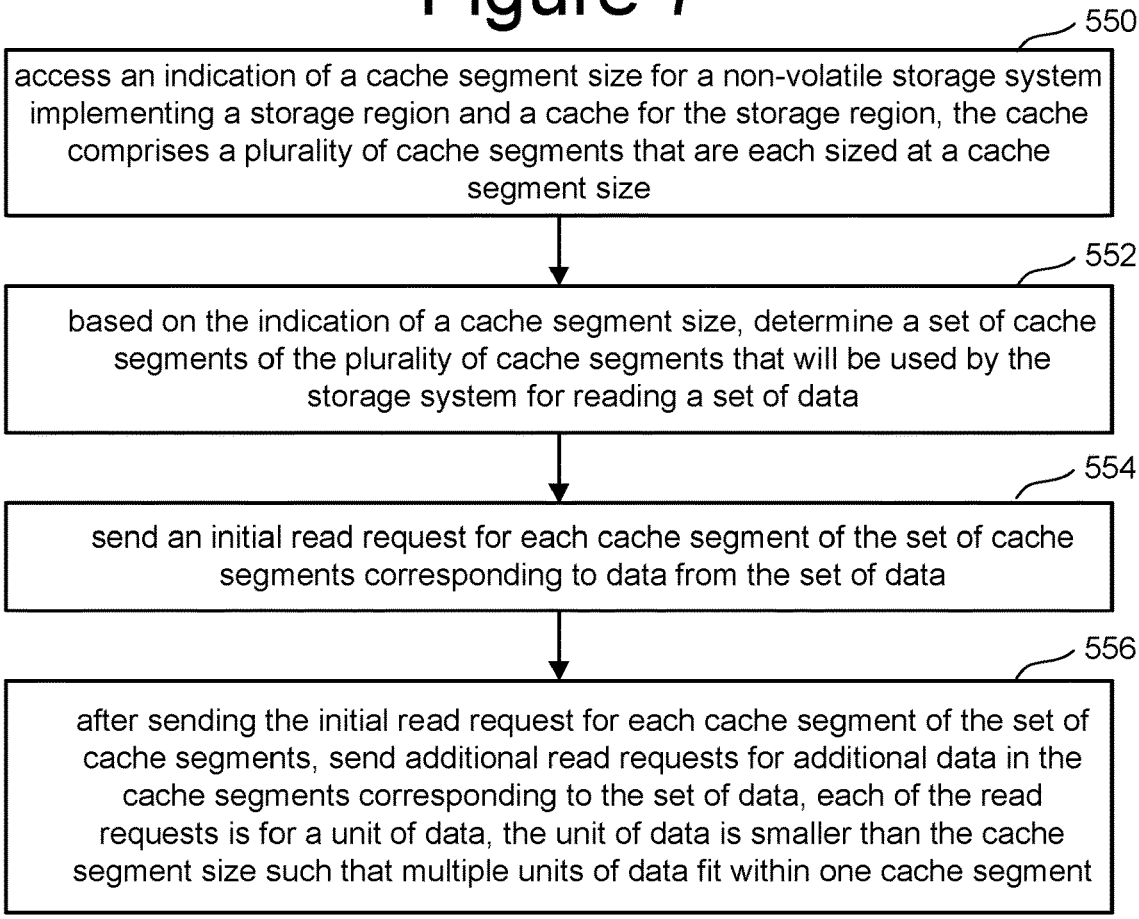
FIG. 7 is a flow chart describing one embodiment of a process for reading data.

FIG. 7 is a flow chart describing one embodiment of a process for reading data. The process of FIG. 7 is an example implementation of the process of FIG. 6. In one embodiment, the process of FIG. 7 is performed by host 120. In step 550, host 120 accesses an indication of the cache segment size for non-volatile storage system 100, which is implementing a storage region (e.g., PMR 350) and a cache for the storage region (e.g. PMR cache 284). The cache comprises a plurality of cache segments that are each sized at a cache segment size. In one example, storage system 100 sends the cache segment size to host 120 at the time that storage system 100 is powered on and/or initialized. In another embodiment, storage system 100 sends the cache segment size to host 120 periodically or at a time different than initialization. In another embodiment, storage system 100 sends the cache segment size to host 120 in response to a request from host 120. In yet another embodiment, host 120 determines what the cache segment size should be and informs storage system 100 of that cache segment size. In yet another embodiment, storage system 100 stores an indication of the cache segment size in a known location for host 120 to read. Other variations can also be implemented.

In step 552, based on the indication of a cache segment size, host 120 determines a set of cache segments of the plurality of cache segments that will be used by storage system 100 for reading a set of data. For example, if host 120 needs to read the data labeled in FIG. 5A as dTLP256-dTLP390, then host 120 determines that cache segment 2 and cache segment 3 will be used by storage system 100 for reading the requested data. By knowing the cache segment size, host 120 can determine which cache segments corresponds to which pages or metapages of data. In one embodiment, storage system 100 can also inform host 120 of the correspondence between cache segments and address ranges of the PMR. In another embodiment, different cache segments can have different sizes and storage system 100 will inform host 120 about which cache segments have which size.

In step 554, host 120 sends an initial read request for each cache segment of the set of cache segments corresponding to data from the set of data. For example, looking at FIG. 5A, host 120 initially sends TLP0, TLP128, TLP 256 and TLP 384 to storage system 100 in step 554. In the example above where host 120 only needs dTLP256-dTLP390, then host 120 will send TLP 256 and TLP 384 to storage system 100 in step 554.

In the example host 120 will initially send TLP0, TLP128, TLP 256 and TLP 384 to storage system 100 in step 554, storage system will respond to those four TLPs by reading the data for dTLP0-dTLP511, loading that data into cache segments 0-3, and sending four completion TLPs to host 120 (one completion TLP in response to TLP0, one completion TLP in response to TLP128, one completion TLP in response to TLP256, and one completion TLP in response to TLP384). The completion TLP in response to TLP0 will include dTLP0. The completion TLP in response to TLP128 will include dTLP128. The completion TLP in response to TLP256 will include dTLP256. The completion TLP in response to TLP384 will include dTLP384.

In step 556, after sending the initial read request for each cache segment of the set of cache segments, host 120 sends additional read requests for additional data in the cache segments corresponding to the set of data. Each of the read requests is for a unit of data (e.g., TLP unit of data). In some embodiments, the TLP unit of data is smaller than the cache segment size such that multiple TLP units of data fit within one cache segment.

Figure 8:
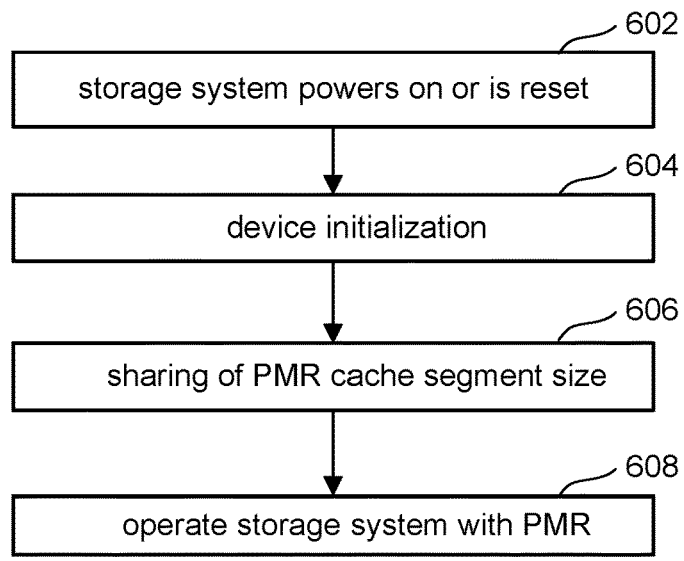
FIG. 8 is a flow chart describing one embodiment of a process performed by a storage system.

FIGS. 8-11 are flow charts that together describe one embodiment of a process for reading data. The process of FIGS. 8-11 is an example implementation of the process of FIG. 6. The process of FIGS. 8-11 is also an example implementation of the process of FIG. 7. FIGS. 8, 10 and 11 describe operation of storage system 100. FIG. 9 describe operation of host 120.

In step 602 of FIG. 8, storage system 100 is powered on and/or is reset. In step 604, storage system 100 is initialized. In step 606, storage system shares the cache segment size of PMR cache 284 with host 120. This sharing of the cache segment size can be performed using any of the methods described above. In step 608, storage system is operated with PMR 350 implemented. In one embodiment, PMR 350 is implemented to allow direct memory-level access and PMR 350 is mapped to host memory 124 such that a direct pointer-type read or write can be performed. Steps 704-722 of FIG. 9, the process of FIG. 10 and the process of FIG. 11 are all performed as part of step 608 of FIG. 8.

FIG. 9 describes the operation of host 120 when reading PMR 350. Step 702 of FIG. 9 includes host 120 receiving the cache segment size for PMR cache 284. This sharing of the cache segment size can be performed using any of the methods described above. Host 120 can also receive other details of PMR 350 and PMR cache 284, as described above. Host 120 may receive one cache segment size or multiple cache segment sizes, as described above. Step 720 of FIG. 9 is performed in response to step 606 of FIG. 8.

In step 704 of FIG. 9, host 120 determines that a set of data needs to be read from PMR 350 and determines addresses in the PMR for that data. In one embodiment, those addresses are in the host memory address space. In step 706, based on the cache segment size, host 120 determines the set of cache segments that will be used by storage system 100 for reading the set of data. Step 706 is analogous to step 552.

In step 708, host 120 generates and sends a first read request TLP (a read request TLP is an example of a read request) for each cache segment that will be used by the storage system for reading the set of data. As described above, the read request TLP requests the reading of a TLP unit of data, which is smaller than the cache segment size such that multiple TLP units of data fit within one cache segment. In the example above with respect to FIG. 5A, the host initially sends TLP0, TLP128, TLP 256 and TLP 384 to storage system 100. However, different TLPs can be sent as long as the host sends at least one TLP for each cache segment that will be used by the storage system for reading the set of data. For example, in step 708 host 120 can also send any one of TLP0-TLP127, any one of TLP128-TLP255, any one of TLP256-TLP383 and any one of TLP384-TLP511. In one example, host 120 sends TLP4, TLP135, TLP300 and TLP414 in step 708. In each of these examples, the host sends one read request for each cache segment of the set of the cache segments that will be used by the storage system for reading the set of data. In other embodiments, host can send more than one read request for each cache segment of the set of the cache segments that will be used by the storage system for reading the set of data.

In step 710, host 120 monitors for receipt of completion TLPs that are sent to host 120 in response to the first read request TLPs sent by host 120 in step 708. In one embodiment, host 120 determines whether a completion TLP is received for the current cache segment being operated on. If not, host 120 continues to wait. If host 120 has received the completion TLP for the current cache segment, host 120 will send out additional read request TLPs for the current cache segment in steps 714-716. For example, if host needs to read dTLP0-dTLP511 (step 704) and determines that cache segments 0-3 will be used by storage system 100 to read that data (step 706), then in step 708 host 120 will send out only TLP0, TLP128, TLP 256 and TLP 384 to storage system 100. After host 120 sends the one read request TLP for each cache segment of the set of cache segments, host 120 will send the additional read requests (e.g., TLP1-TLP127, TLP129-TLP255, TLP257-TLP383 and TLP385-TLP511). In one embodiment, the additional read request TLPs are sent out sequentially. Therefore, first the additional read request TLPs are sent out for cache segment 0. So the first time step 714 is performed for this read process, the "current cache segment" is cache segment 0 and host 120 determines whether it has received the completion TLP for TLP0 (or which first read request for cache segment 0 was sent out in step 708).

In step 714, host 120 generates and sends an additional read request TLP for the next TLP unit of data for the current cache segment. The first time step 714 is performed for this read process, step 714 includes generating and sending out TLP1. In step 716, host determines whether there are more TLP units of data to request for the current cache segment. If the last TLP sent out was TLP1, then the answer is yes and the process loops back to step 714 so TLP2 can be sent out. And so on, until all read request TLPs for the current cache segment have been sent out (e.g., TLP0-TLP127 have all been sent out). When all read request TLPs for the current cache segment have been sent out, then the process continues at step 718 at which time host 120 determines if there are more cache segments that need to be read from. If not, then the read process is complete and the data read is stored in host memory 124 (sept 722). If there are more cache segments that need to be read from then host 120 will proceed to start reading the additional data from the next cache segment (step 720) and the process loops back to step 714 to start reading additional data from the new current cache segment. For example, after reading all of the data from cache segment 0, host 120 will proceed to request to read data from cache segment 1 (thus, cache segment 1 becomes the new current cache segment) and the process loops back to step 714 to start reading additional data from cache segment 1. Steps 714-722 comprise sending additional read requests for individual cache segments of the set of cache segments after receiving at least one completion message for the respective cache segment in response to a respective read request of the initial read request for each cache segment.

In the example above, host reads data from the cache segments in order from cache segment 0 to cache segment 3. However, host 120 can read the data in other orders.

In the above-described embodiment, host 120 does not start sending additional read request TLPs for a cache segment until host 120 receives at least one completion TLP for that cache segment. This is because when host 120 receives at least one completion TLP for that cache segment, host 120 then knows that all of the data for that cache segment has been loaded into the PMR cache. In another embodiment, rather than wait until host 120 receives at least one completion TLP for that cache segment, host 120 can implement a timer that determines when a predetermined period of time has elapsed since sending out the first read request TLP for each cache segment in step 708. When that predetermined period of time has elapsed, the additional read request TLPs of step 714 can be sent out. In one example implementation, the predetermined period of time could be the sum of the time needed to read from the non-volatile memory, the time needed to load the data read into the PMR cache, and the time needed to communicate a completion TLP. Other predetermined periods can also be used. For example, step 714 can start to be performed for cache segment 0 and dTLP1 after waiting for the predetermined time period following the sending the initial read requests (TLP0, TLP128, TLP 256 and TLP 384) for each cache segment. Alternatively, step 714 can start to be performed for cache segment 0 and dTLP1 after waiting for the predetermined time period following the sending the initial read request TLP0 for each cache segment 0.

FIG. 10 describes operation of storage system 100. The process of FIG. 10 is performed multiple times in order for the storage system to read the set of data from the PMR and load the set of data into the set of the cache segments. In step 830, storage system 100 receives a read request TLP from host 100. Step 830 can be performed in response to step 708 of FIG. 9. As discussed above, in one embodiment step 708 of FIG. 9 may include sending out more than one read request TLPs. For example, in one embodiment step 708 may include sending out read requests TLP0, TLP128, TLP 256 and TLP 384. In that case, storage system may perform the process of FIG. 10 four times concurrently. That is, step 830 is performed for each of read requests TLP0, TLP128, TLP 256 and TLP 384 by starting four instances of the process of FIG. 10 that are performed concurrently. For purposes of this document, the term "concurrently" is used to mean that two or more events/processes/tasks are happening during at least one common moment in time, even if they start and stop at different times. For example, storage system 100 may read a first group of data from the PMR and load that first group of data into cache segment 0 concurrently with storage system 100 reading a second group of data from the PMR and loading that second group of data into second cache segment 1, even if the reading of the first group of data started slightly before the reading of the second group of data because from the start of the reading of the second group of data until the completion of the loading of the first group of data into cache segment0, both processes were running.

In step 832, storage system 100 determines whether the data requested by the read request received in step 830 is already stored in PMR cache 284. If so, then in step 834 that the data requested by the read request received in step 830 is transmitted from the PMR cache 284 to host 120 as part of a completion TLP. If the data requested by the read request received in step 830 is not already stored in PMR cache 284, then (in step 836) storage system 100 determines whether the read request received in step 830 is the first read request for the relevant cache segment in PMR cache 284. If the TLP being considered in step 836 is the first read request for the relevant cache segment in PMR 284, then the storage system has not already started the process to fill the relevant cache segment; therefore, in step 838 storage system will read the data for the entire cache segment (that includes the data requested in the TLP being considered) from PMR 350 and load that data into the appropriate cache segment. In one embodiment, step 838 includes storage system reading a metapage of data and storing that metapage in a cache segment. In one embodiment, reading the metapage comprises the memory controller reading a physical page of data from each of multiple memory dies and aggregating the physical pages of data to form a meta page which corresponds to a cache segment of data. After the cache segment is loaded with the data read in step 838, the data requested in the current read request TLP being processed is transmitted to host 120 in a completion TLP as part of step 840.

If, in step 836, storage system 100 determined that the TLP being considered in step 836 is not the first read request for the relevant cache segment in PMR 284, then the storage system has already started the process to fill the relevant cache segment and does not need to start another operation to read form non-volatile memory. Rather, storage system 100 will wait until the appropriate cache segment is loaded with the data read in step 838, and then the data requested in the current read request TLP being processed is transmitted to host 120 in a completion TLP as part of step 840.

Consider the following example, using the elements of FIG. 5A. If step 836 is being performed by sending TLP128, then TLP128 is the first read request for the relevant cache segment in PMR cache 284; therefore, the process continues to step 838 to read from PMR 350 the metapage that includes dTLP128-dTLP255 and store that data in cache segment1. If step 836 is being performed by TLP129, then the storage system can determine that TLP129 is not the first read request for the relevant cache segment in PMR cache 284 because TLP128 was already received; therefore, the process continues to step 840 so that the storage system can wait until cache segment 1 is fully loaded to transmit dTLP129 to host 120 in a completion TLP.

In summary, FIG. 10 demonstrates that when storage system 100 receives the first read request for a cache segment, it reads the data for the cache segment from the PMR in non-volatile memory, loads the data in the cache segment and returns the requested data to host 120. When storage system 100 receives additional read requests, after the initial/first read request for the cache segment, storage system returns additional data to host 120 in response to the additional read requests by reading the additional data from the appropriate cache segment(s) and transmitting the additional data read to host 120.

FIG. 11 is a flow chart describing one embodiment of a process for reading a metapage of data from PMR 350 in non-volatile memory and storing the data for that metapage into a cache segment of PMR cache 284. Thus, the process of FIG. 11 is an example implementation of step 838 of FIG. 10. In step 902 of FIG. 11, PMR manager 184 converts the PMR address from the read request TLP to a set of LBAs for all of the data in the metapage that includes the data requested in the read request TLP. Those LBAs are provided to memory processor 156, which implements a flash translation layer that translates the LBAs to physical addresses in the non-volatile memory in step 904. In another embodiment, PMR 350 can also point to physical addresses in non-volatile memory and not logical addresses; for example, the data might have originally been written using a sequential pattern such as ZNS and as such not require individual logical addressing at the PMR level since the data is always sequential and parallel within the memory dies. In step 906, memory processor 156 (or processor 220 or another processor) will build one or more read commands to concurrently read data for the metapage from one or more planes on one or more memory die. If the bus between memory controller 102 and non-volatile memory 104 (see channels for communicating with Memory Package depicted in FIG. 1C) is busy and not available to transfer additional data (step 908), then memory controller 102 will wait until the bus is available. When the bus between memory controller 102 and non-volatile memory 104 is available to transfer additional data, then in step 910 the appropriate BEP 112 will send the one or more read commands to one or more memory die so that the data of the metapage is concurrently read from one or more planes on one or more die that comprise the PMR. In step 912, memory controller 102 receives the data for the metapage that was sensed from one or more planes on one or more die. In step 914, that data is decoded to remove error correction information (e.g., extra parity bits) and recover the original data. In step 916, the data read for the metapage is loaded into the appropriate cache segment.

FIG. 12A depicts a plurality of cache segments and provides an example of efficiently reading the PMR according to the processes of FIGS. 8-11. FIG. 12A shows four cache segments: cache segment 0, cache segment 1, cache segment 2 and cache segment 3. Four cache segments are depicted for example purposes only. A PMR cache is likely to have more than four cache segments. The exact number of cache segments is implementation dependent. In the example of FIG. 12A, each cache segment stores the equivalent of 128 TLP units of data. Note that the reference labels for the data in the cache segments is made to match the reference labels of FIG. 5A, but in the example of FIG. 12A the reference labels for the data is not based on the order that the host requests the TLP units of data. The order that host 120 requests the TLP units of data according to the processes of FIGS. 8-11 is graphically displayed in the order depicted by arrows 950, 952, 954, 956, 958, 960, 962,964, 966 and 968. FIG. 12B depicts the read request TLPs in the order that they are issued by host 120 for this example.

Prior to any of the TLPs depicted in FIG. 12B, storage system 100 informed host 120 of the cache segment size (see step 702 of FIG. 9), host 120 determined that the set of data dTLP0-dTLP511 needs to be read from PMR 350 (see step 704 of FIG. 9) and host 120 used the cache segment size to determine a set of the cache segments (cache segment 0, cache segment 1, cache segment 2 and cache segment 3) that will be used by storage system 100 for reading the set of data (see step 706 of FIG. 9).

Host 120 first sends at least one read request TLP for each cache segment of the set of the cache segments that will be used by the storage system for reading the set of data (see step 708 of FIG. 9). For example, FIG. 12B shows that the first four read request TLPs sent by host 120 are TLP0, TLP128, TLP256 and TLP384. So this initial set of read request TLPs includes exactly one TLP for each cache segment of the set of the cache segments that will be used by the storage system for reading the set of data. In response to the initial set of read request TLPs (TLP0, TLP128, TLP256 and TLP384), storage system 100 reads at least a portion of the set of data from PMR 350 (e.g., all of the set of data or a subset of the set of data) and loads that portion of the set of data into the set of the cache segments in response to the at least one read request for each cache segment of the set of cache segments. For example, in response to receiving TLP0, TLP128, TLP256 and TLP384, storage system 100 performs the process of FIG. 10 four times concurrently (once for each of TLP0, TLP128, TLP256 and TLP384), with each instance of performing the process of FIG. 10 resulting in the reading of a metapage and loading that metapage into a respective cache segment (see step 838 of FIG. 10). For example, in response to receiving TLP0 storage system 100 determines that dTLP0 is not in PMR cache 284 (step 832) and that TLP0 is the first read request for PMR cache segment 0 (see step 836); therefore, storage system 100 reads dTLP0-dTLP127 from PMR 250 (in non-volatile memory) and loads dTLP0-dTLP127 into cache segment 0 (see step 838). In response to receiving TLP128 storage system 100 determines that dTLP128 is not in PMR cache 284 (step 832) and that TLP128 is the first read request for PMR cache segment 1 (see step 836); therefore, storage system 100 reads dTLP128-dTLP255 from PMR 250 (in non-volatile memory) and loads dTLP128-dTLP255 into cache segment 0 (see step 838). In response to receiving TLP256 storage system 100 determines that dTLP256 is not in PMR cache 284 (step 832) and that TLP256 is the first read request for PMR cache segment 2 (see step 836); therefore, storage system 100 reads dTLP256-dTLP383 from PMR 250 (in non-volatile memory) and loads dTLP256-dTLP383 into cache segment 2 (see step 838). In response to receiving TLP384 storage system 100 determines that dTLP384 is not in PMR cache 284 (step 832) and that TLP384 is the first read request for PMR cache segment 3 (see step 836); therefore, storage system 100 reads dTLP384-dTLP511 from PMR 250 (in non-volatile memory) and loads dTLP384-dTLP511 into cache segment 3 (see step 838).

Note that in other example implementations, the initial set of read request TLPs can be TLPs other than TLP0, TLP128, TLP256 and TLP384. The host needs to send at least one TLP for each relevant cache segment. Therefore, the initial set of read request TLPs can include, for example, TLP5, TLP129, TLP383 and TLP440 as this set includes at least one TLP for each relevant cache segment.

Storage system 100 sends initial data back to host 120 using completion TLPs in response to one or more of the at least one read request for each cache segment of the set of cache segments. This initial data is sent from PMR cache 284 after the respective metapage is loaded into the respective cache segment of PMR cache 284. For example, in response TLP0 storage system transmits dTLP0 to host 120 after dTLP0-dTLP127 are loaded into cache segment 0; in response TLP128 storage system transmits dTLP128 to host 120 after dTLP128-dTLP255 are loaded into cache segment 1; in response TLP256 storage system transmits dTLP256 to host 120 after dTLP256-dTLP383 are loaded into cache segment 2; and in response TLP384 storage system transmits dTLP384 to host 120 after dTLP384-dTLP511 are loaded into cache segment 3 (see step 840 of FIG. 10).

After host 120 sends the at least one read request for each cache segment of the set of cache segments, host 120 sends additional read request TLPs for additional data of the set of data. In one embodiment, the additional read request TLPs are sent when a predetermined period of time has elapsed since sending out the first read request TLP for each cache segment. In one embodiment, the additional read request TLPs are sent in response to the corresponding completion TLPs (see steps 712 and 714 of FIG. 9). For example, in response to receiving a completion TLP for TLP0 host 120 will send out TLP1-TLP127, in response to receiving a completion TLP for TLP128 host 120 will send out TLP129-TLP255, in response to receiving a completion TLP for TLP256 host 120 will send out TLP257-TLP383, and in response to receiving a completion TLP for TLP384 host 120 will send out TLP385-TLP511 (see FIG. 12B).

In response to the additional read request TLPs, storage system 100 reads the additional data (e.g., dTLP1-dTLP127, dTLP129-dTLP255, dTLP257-dTLP383, and dTLP385-dTLP511) from the respective cache segments and transmits that additional data to host 120 (see step 834 of FIG. 10 performed multiple times as the process of FIG. 10 is performed for each read request TLP received).

A non-volatile storage system has been disclosed that shares details of the structure of the storage region and/or the cache (e.g., cache segment size). With awareness of the shared details of the structure of the storage region and/or the cache, the host arranges and sends out requests to read data in a manner that takes advantage of parallelism within the non-volatile storage system. For example, the host may initially send out one read request per cache segment to cause the non-volatile storage system to load the cache. Subsequently, additional read requests are made to the non-volatile storage system, with the data already loaded (or starting to load) in the cache, thereby increasing performance.

One embodiment includes a method comprising: a non-volatile storage system, that is implementing a persistent memory region ("PMR") and a PMR cache comprising a plurality of cache segments that are each a cache segment size, informing a host connected to the storage system of the cache segment size; the host determining that a set of data needs to be read from the PMR; the host using the cache segment size to determine a set of the cache segments that will be used by the storage system for reading the set of data; the host sending at least one read request for each cache segment of the set of the cache segments that will be used by the storage system for reading the set of data; the storage system reading at least a portion of the set of data from the PMR and loading at least the portion of the set of data into the set of the cache segments in response to the at least one read request for each cache segment of the set of cache segments; after the host sends at least one read request for each cache segment of the set of cache segments, the host sending additional read requests for additional data of the set of data; and the storage system transmitting the additional data to the host in response to the additional read requests by reading the additional data from the set of the cache segments and transmitting the additional data read to the host.

One embodiment includes a non-transitory processor readable storage medium storing processor readable code that when executed on a processor causes the processor to perform a method comprising: accessing an indication of a cache segment size for a non-volatile storage system implementing a storage region and a cache for the storage region, the cache comprises a plurality of cache segments that are each sized at the cache segment size; based on the indication of the cache segment size, determining a set of cache segments of the plurality of cache segments that will be used by the storage system for reading a set of data; sending an initial read request for each cache segment of the set of cache segments corresponding to data from the set of data; and after sending the initial read request for each cache segment of the set of cache segments, sending additional read requests for additional data in the cache segments corresponding to the set of data, each of the read requests is for a unit of data, the unit of data is smaller than the cache segment size such that multiple units of data fit within one cache segment.

One embodiment includes an apparatus comprising non-volatile memory configured to implement a persistent memory region in the non-volatile memory that is accessible by a host; a persistent memory region cache comprising a plurality of cache segments that are each a cache segment size; and a processor connected to the non-volatile memory and the persistent memory region cache. The processor is configured to communicate with a host. The processor is configured to transmit the cache segment size to the host. The processor is further configured to receive an initial set of read requests from the host including one read request for each cache segment of a set of cache segments of the plurality of cache segments, read data from the persistent memory region for each read request of the initial set of read requests, store the data read into the cache segments of the set of cache segments, send a completion response with requested data for each of the read requests of the initial set of read requests, after receiving the initial set of read requests, receive additional read requests for data that is already stored in the set of cache segments in response to the initial set of read requests, and send a completion response with requested data for the for each of the additional read requests such that the requested data is sent was obtained from one or more of cache segments of the set of cache segments.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A method comprising:
   a non-volatile storage system, that is implementing a persistent memory region ("PMR") and a PMR cache comprising a plurality of cache segments that are each a cache segment size, informing a host connected to the storage system of the cache segment size;
   the host determining that a set of data needs to be read from the PMR;
   the host using the cache segment size to determine a set of the cache segments that will be used by the storage system for reading the set of data;
   the host sending a plurality of read requests including at least one read request for each cache segment of the set of the cache segments that will be used by the storage system for reading the set of data;
   in response to the plurality of read requests, the storage system reading groups of data from the PMR, loading the groups of data into the set of the cache segments, and transmitting a unit of data from each cache segment of the set of cache segments to the host such that each group of data is at a cache segment size and the unit of data is smaller than the cache segment size such that multiple units of data fit within one cache segment;
   after the host sends the at least one read request for each cache segment of the set of cache segments, the host sending additional read requests for additional data of the set of data; and
   the storage system transmitting the additional data to the host in response to the additional read requests by reading the additional data from the set of the cache segments and transmitting the additional data read to the host.

2. The method of claim 1, further comprising:
   the storage system sending first data back to the host in response to one or more of the at least one read request for each cache segment of the set of cache segments, the first data is a unit of data from the PMR cache, the host sends the additional read requests in response to receiving the first data.

3. The method of claim 1, wherein:
   the plurality of cache segments includes a first cache segment and a second cache segment;

the at least one read request for each cache segment of the set of the cache segments that will be used by the storage system for reading the set of data includes a first read request for a first unit of data from the first cache segment and a second read request for a second unit of data from the second cache segment;

the storage system reading groups of data from the PMR and loading the groups of data into the set of the cache segments and transmitting a unit of data from each cache segment of the set of cache segments comprises the storage system reading a first group of data from the PMR, loading the first group of data into the first cache segment, transmitting the first unit of data from the first cache segment to the host, reading a second group of data from the PMR, loading the second group of data into the second cache segment, and transmitting the second unit of data from the second cache segment to the host;

the first group of data includes the first unit of data, the second group of data includes the second unit of data, the first group of data and the second group of data are at the cache segment size, the unit of data is smaller than the cache segment size such that multiple units of data fit within one cache segment; and the additional read requests include additional read requests for additional data from the first cache segment and additional read requests for additional data from the second cache segment, the host sends the additional read requests for additional data from the first cache segment in response to the storage system transmitting the first unit of data from the first cache segment.

4. The method of claim 3, wherein:
the storage system reading the first group of data from the PMR and loading the first group of data into the first cache segment is performed concurrently with the storage system reading the second group of data from the PMR and loading the second group of data into the second cache segment.

5. The method of claim 1, further comprising:
the host waiting a predetermined period of time after the host sends at least one read request for each cache segment of the set of the cache segments, the host sends the additional read requests after waiting the predetermined period of time.

6. The method of claim 1, wherein the storage system reading groups of data from the PMR, loading the groups of data into the set of the cache segments, transmitting a unit of data from each cache segment and transmitting the additional data read to the host comprises:
the storage system receiving a TLP from the host;
the storage system determining whether a unit of data requested by the TLP is in the PMR cache;
transmitting the unit of data to the host in response to determining that the unit of data is in the PMR cache;
determining if the TLP is a first read request for a PMR cache segment that corresponds to an address in the TLP in response to determining that the unit of data is not in the PMR cache; and
in response to determining that the TLP is a first read request for the PMR cache segment that corresponds to the address in the TLP, reading PMR data from the PMR, loading the PMR data into the PMR cache and transmitting the unit of data to the host from the PMR cache segment that corresponds to the address in the TLP.

7. The method of claim 1, wherein:
the storage system comprises a memory controller connected to volatile memory and non-volatile memory, the PMR resides in the non-volatile memory, the PMR cache resides in the volatile memory, the non-volatile memory comprises multiple memory dies;
the plurality of cache segments includes a first cache segment and a second cache segment;
the at least one read request for each cache segment of the set of the cache segments includes a first read request for a first unit of data and a second read request for a second unit of data; and
the storage system reading groups of data from the PMR and loading the groups of data into the set of the cache segments includes the memory controller reading a page of data from each of the multiple memory dies, aggregating the pages of data to form a cache segment of data and storing the cache segment of data in the first cache segment.

8. The method of claim 1, wherein:
the host is connected to the storage system by a Peripheral Component Interconnect Express ("PCIe") connection; and
each read request of the at least one read request for each cache segment of the set of the cache segments is a PCIe Transaction Layer Packet ("TLP") that requests a unit of data.

9. A non-transitory processor readable storage medium storing processor readable code that when executed on a processor causes the processor to perform a method comprising:
accessing an indication of a cache segment size for a non-volatile storage system implementing a storage region and a cache for the storage region, the cache comprises a plurality of cache segments that are each sized at the cache segment size;
based on the indication of the cache segment size, determining a set of cache segments of the plurality of cache segments that will be used by the storage system for reading a set of data; and
sending read requests for the host data to the non-volatile storage system including sending an initial read request for each cache segment of the set of cache segments, waiting until receiving one or more completion responses for one or more of the initial read requests after sending the initial read request for each cache segment of the set of cache segments and sending additional read requests for data that is already stored in the set of cache segments in response to receiving the one or more completion responses, each of the read requests is for a unit of data, the unit of data is smaller than the cache segment size such that multiple units of data fit within one cache segment.

10. The non-transitory processor readable storage medium of claim 9, wherein:
the storage region is a persistent memory region ("PMR"); and
the cache is a PMR cache.

11. The non-transitory processor readable storage medium of claim 9, wherein:
the plurality of cache segments includes a first cache segment and a second cache segment;
the initial read request for each cache segment includes a first read request for a first unit of data from the first cache segment and a second read request for a second unit of data from the second cache segment;
the method further comprises receiving the first unit of data from the non-volatile storage system; and the additional read requests include additional read requests for additional data from the first cache segment and additional read requests for additional data from the second cache segment, the additional read requests for additional data from the first cache segment are sent to the non-volatile storage system in response to the receiving the first unit of data from the non-volatile storage system.

12. The non-transitory processor readable storage medium of claim 9, wherein:
the plurality of cache segments includes a first cache segment and a second cache segment;
the initial read request for each cache segment includes a first read request for a first unit of data from the first cache segment and a second read request for a second unit of data from the second cache segment; and
the additional read requests include additional read requests for additional data from the first cache segment and additional read requests for additional data from the second cache segment.

13. The non-transitory processor readable storage medium of claim 9, wherein:
the set of data is stored in the storage region at a set of addresses;
the determining the set of cache segments of the plurality of cache segments that will be used by the storage system for reading the set of data comprises determining which subset of the plurality of cache segments corresponds to the set of addresses.

14. The non-transitory processor readable storage medium of claim 9, wherein:
the accessing the indication of the cache segment size includes receiving the indication of the cache segment size from the non-volatile storage system.

15. The non-transitory processor readable storage medium of claim 9, wherein:
the storage region is a persistent memory region ("PMR");
the cache is a PMR cache;
the accessing, determining, sending the initial read request for each cache segment and the sending additional read requests are performed by a host computer connected to the non-volatile storage system by a Peripheral Component Interconnect Express ("PCIe") connection; and
each read request of the initial read request for each cache segment is a PCIe Transaction Layer Packet ("TLP").

16. An apparatus comprising:
non-volatile memory configured to implement a persistent memory region in the non-volatile memory that is accessible by a host;
a persistent memory region cache comprising a plurality of cache segments that are each a cache segment size, the set of cache segments includes a first cache segment, a second cache segment and a third cache segment; and
a processor connected to the non-volatile memory and the persistent memory region cache, the processor is configured to communicate with a host, the processor is configured to transmit the cache segment size to the host, the processor is further configured to:
receive an initial set of read requests from the host including one read request for each cache segment of a set of cache segments of the plurality of cache segments, each read request is for a request unit of data, the request unit of data is smaller than the cache segment size such that multiple request units of data fit within on cache segment, the receiving the initial set of read requests comprises receiving one read request for the first cache segment as well as receiving one read request for the second cache segment and receiving one read request for the third cache segment,
read data from the persistent memory region for each read request of the initial set of read requests,
store the data read into the cache segments of the set of cache segments,
send a completion response with requested data for each of the read requests of the initial set of read requests,
after receiving the initial set of read requests, receive additional read requests for data that is already stored in the set of cache segments in response to the initial set of read requests, the receiving additional read requests for data that is already stored in the set of cache segments comprises receiving a plurality of read requests for the first cache segment followed by receiving a plurality of read requests for the second cache segment followed by receiving a plurality of read requests for the third cache segment, and
send a completion response with requested data for each of the additional read requests such that the requested data that is sent was obtained from one or more of cache segments of the set of cache segments.

17. The apparatus of claim 16, further comprising:
a volatile memory, the persistent memory region cache is resident in the volatile memory, the processor comprises a memory controller, the memory controller is connected to the volatile memory, the request unit of data is smaller than the cache segment size such that multiple request units of data fit within on cache segment.

18. The apparatus of claim 16, further comprising:
a computer that is external to the non-volatile memory and the processor, the computer implements the host, the processor includes a host interface for communicating with the host, the computer is connected to the host interface, the host is configured to:
receive the cache segment size from the processor;
based on the cache segment size and addresses for a set of host data, identify the set of cache segments of the plurality of cache segments because they will be used by the processor for reading the set of host data, the set of host data comprises the requested data for each of the read requests of the initial set of read requests and the requested data for the for each of the additional read requests,
send the initial set of read requests;
wait until receiving one or more completion responses for one or more of the initial set of read requests; and
in response to receiving the one or more completion responses, send the additional read requests for data that is already stored in the set of cache segments.

* * * * *